(12) United States Patent
Tasoulas et al.

(10) Patent No.: US 11,716,247 B2
(45) Date of Patent: *Aug. 1, 2023

(54) SYSTEM AND METHOD FOR SUPPORTING FAST HYBRID RECONFIGURATION IN A HIGH PERFORMANCE COMPUTING ENVIRONMENT

(71) Applicant: ORACLE INTERNATIONAL CORPORATION, Redwood Shores, CA (US)

(72) Inventors: Evangelos Tasoulas, Oslo (NO); Ernst Gunnar Gran, Oslo (NO); Tor Skeie, Oslo (NO); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,328

(22) Filed: May 29, 2020

(65) Prior Publication Data

US 2020/0295992 A1 Sep. 17, 2020

Related U.S. Application Data

(63) Continuation of application No. 16/040,114, filed on Jul. 19, 2018, now Pat. No. 10,708,131, which is a
(Continued)

(51) Int. Cl.
*H04L 41/0813* (2022.01)
*H04L 49/356* (2022.01)
(Continued)

(52) U.S. Cl.
CPC ........ *H04L 41/0813* (2013.01); *G06F 9/5077* (2013.01); *H04L 41/083* (2013.01);
(Continued)

(58) Field of Classification Search
CPC . H04L 49/15; H04L 41/0836; H04L 41/0813; H04L 49/10
See application file for complete search history.

(56) References Cited

U.S. PATENT DOCUMENTS 6,839,794 B1    1/2005  Schober
6,922,749 B1    7/2005  Gil et al.
(Continued)

FOREIGN PATENT DOCUMENTS

CN    103843302     6/2014
JP    2015517762    6/2015
(Continued)

OTHER PUBLICATIONS

Indian Patent Office, First Examination Report dated Jan. 12, 2021 for Indian Patent Application No. 201747046145, 6 pages.
(Continued)

*Primary Examiner* — Syed Ali
(74) *Attorney, Agent, or Firm* — Tucker Ellis LLP

(57) ABSTRACT

A hybrid reconfiguration scheme can allow for fast partial network reconfiguration with different routing algorithms of choice in different subparts of the network. Partial reconfigurations can be orders of magnitude faster than the initial full configuration, thus making it possible to consider performance-driven reconfigurations in lossless networks.

6 Claims, 16 Drawing Sheets

Related U.S. Application Data continuation of application No. 15/891,183, filed on Feb. 7, 2018, now Pat. No. 10,097,412, which is a continuation of application No. 15/680,463, filed on Aug. 18, 2017, now Pat. No. 10,057,119.

(60) Provisional application No. 62/378,583, filed on Aug. 23, 2016.

(51) Int. Cl.
| | |
|---|---|
| H04L 41/083 | (2022.01) |
| H04L 41/0823 | (2022.01) |
| H04L 49/10 | (2022.01) |
| H04L 49/15 | (2022.01) |
| G06F 9/50 | (2006.01) |
| H04L 12/44 | (2006.01) |

(52) U.S. Cl.
CPC .......... *H04L 41/0836* (2013.01); *H04L 49/10* (2013.01); *H04L 49/15* (2013.01); *H04L 49/358* (2013.01); *H04L 12/44* (2013.01)

(56) References Cited

U.S. PATENT DOCUMENTS

| | | | |
|---|---|---|---|
| 6,954,459 | B1 | 10/2005 | Vaidhyanathan et al. |
| 7,010,607 | B1* | 3/2006 | Bunton ............... H04L 1/18 709/228 |
| 7,088,710 | B1* | 8/2006 | Johnson ............. H04L 49/606 370/357 |
| 7,103,626 | B1 | 9/2006 | Recio et al. |
| 7,171,484 | B1 | 1/2007 | Krause et al. |
| 7,400,590 | B1 | 7/2008 | Rygh et al. |
| 7,681,130 | B1* | 3/2010 | Lavallee ............. H04L 41/22 715/738 |
| 7,738,371 | B1 | 6/2010 | Rimmer et al. |
| 7,983,265 | B1 | 7/2011 | Dropps |
| 9,237,111 | B2 | 1/2016 | Banavalikar |
| 9,311,133 | B1 | 4/2016 | Nataraja et al. |
| 9,807,003 | B2 | 10/2017 | Zahid |
| 9,836,400 | B2 | 12/2017 | Wang et al. |
| 10,237,378 | B1* | 3/2019 | Seshadri ............. H04J 3/0635 |
| 10,255,213 | B1* | 4/2019 | Habusha ............ G06F 3/0656 |
| 10,257,080 | B1* | 4/2019 | Kusam ............... H04L 45/12 |
| 10,263,839 | B2* | 4/2019 | Li ..................... H04L 41/0806 |
| 10,318,315 | B2* | 6/2019 | Shah .................. H04L 41/12 |
| 10,523,753 | B2* | 12/2019 | Squires .............. G06F 16/1824 |
| 10,623,315 | B1* | 4/2020 | Singh ................. H04L 45/586 |
| 10,877,911 | B1* | 12/2020 | Khan .................. G06F 13/28 |
| 10,977,192 | B1* | 4/2021 | Habusha ............ G06F 12/1027 |
| 11,042,496 | B1* | 6/2021 | BeSerra ............. G06F 13/4282 |
| 11,076,025 | B1* | 7/2021 | Volpe ................. H04L 43/106 |
| 11,086,801 | B1* | 8/2021 | Machulsky ........ G06F 9/45558 |
| 2003/0033426 | A1 | 2/2003 | Beukema et al. |
| 2003/0101426 | A1* | 5/2003 | Sarkinen ............ H04L 45/60 716/126 |
| 2003/0200315 | A1 | 10/2003 | Goldenberg et al. |
| 2003/0223435 | A1 | 12/2003 | Gil |
| 2004/0019876 | A1 | 1/2004 | Dravida et al. |
| 2004/0022245 | A1 | 2/2004 | Forbes et al. |
| 2004/0022257 | A1 | 2/2004 | Green et al. |
| 2004/0024903 | A1 | 2/2004 | Costatino et al. |
| 2004/0030763 | A1 | 2/2004 | Manter et al. |
| 2005/0071472 | A1 | 3/2005 | Arndt et al. |
| 2005/0144313 | A1 | 6/2005 | Arndt et al. |
| 2005/0207368 | A1 | 9/2005 | Nam |
| 2005/0271073 | A1 | 12/2005 | Johnsen et al. |
| 2006/0002385 | A1 | 1/2006 | Johnsen et al. |
| 2006/0268869 | A1 | 11/2006 | Boers et al. |
| 2007/0014308 | A1 | 1/2007 | Gunthorpe et al. |
| 2007/0297428 | A1 | 12/2007 | Bose |
| 2008/0267183 | A1 | 10/2008 | Arndt et al. |
| 2009/0070422 | A1 | 3/2009 | Kashyap et al. |
| 2009/0300605 | A1 | 12/2009 | Edwards |
| 2010/0271974 | A1 | 10/2010 | Byard |
| 2010/0287548 | A1 | 11/2010 | Zhou et al. |
| 2010/0290464 | A1 | 11/2010 | Assarpour |
| 2011/0004735 | A1 | 1/2011 | Arroyo et al. |
| 2011/0019676 | A1 | 1/2011 | Portolani et al. |
| 2011/0228789 | A1 | 9/2011 | Jia |
| 2012/0195308 | A1 | 8/2012 | Shiraki |
| 2012/0287933 | A1 | 11/2012 | Li et al. |
| 2012/0307682 | A1 | 12/2012 | Johnsen et al. |
| 2012/0314706 | A1 | 12/2012 | Liss et al. |
| 2013/0047151 | A1 | 2/2013 | Sridharan et al. |
| 2013/0091269 | A1 | 4/2013 | Zhang et al. |
| 2013/0108263 | A1 | 5/2013 | Srinivas |
| 2013/0121154 | A1 | 5/2013 | Guay |
| 2013/0239121 | A1 | 9/2013 | Rossi |
| 2013/0254321 | A1 | 9/2013 | Johnsen et al. |
| 2013/0254424 | A1 | 9/2013 | Guay et al. |
| 2013/0259033 | A1 | 10/2013 | Hefty |
| 2013/0266009 | A1 | 10/2013 | Colloff et al. |
| 2013/0301646 | A1 | 11/2013 | Bogdanski et al. |
| 2014/0016645 | A1 | 1/2014 | Nomura et al. |
| 2014/0177639 | A1 | 6/2014 | Vershkov et al. |
| 2014/0181823 | A1 | 6/2014 | Manula et al. |
| 2014/0223013 | A1 | 8/2014 | Gaglianello et al. |
| 2014/0241208 | A1* | 8/2014 | Johnsen ............. H04L 63/083 370/254 |
| 2014/0269274 | A1 | 9/2014 | Banavalikar |
| 2014/0269720 | A1* | 9/2014 | Srinivasan ......... H04L 49/358 370/392 |
| 2014/0280665 | A1 | 9/2014 | DeCusatis |
| 2014/0317165 | A1 | 10/2014 | Pelissier et al. |
| 2015/0023214 | A1 | 1/2015 | Soneda et al. |
| 2015/0067191 | A1 | 3/2015 | Makhervaks et al. |
| 2015/0081863 | A1 | 3/2015 | Garg et al. |
| 2015/0098466 | A1* | 4/2015 | Haramaty ........... H04L 12/18 370/390 |
| 2015/0180782 | A1 | 6/2015 | Rimmer et al. |
| 2015/0338909 | A1 | 11/2015 | Woodruff |
| 2016/0072816 | A1 | 3/2016 | Makhervaks et al. |
| 2016/0080255 | A1* | 3/2016 | Ignatuk ............. H04L 67/1097 709/213 |
| 2016/0112305 | A1 | 4/2016 | Djekic et al. |
| 2016/0127236 | A1 | 5/2016 | Zahid |
| 2016/0182177 | A1* | 6/2016 | Weiny ............... H04L 12/4641 370/392 |
| 2016/0216982 | A1 | 7/2016 | Variath |
| 2016/0246631 | A1 | 8/2016 | Tsirkin |
| 2016/0274926 | A1 | 9/2016 | Narasimhamurthy et al. |
| 2017/0005923 | A1 | 1/2017 | Babakian |
| 2017/0063613 | A1 | 3/2017 | Bloch |
| 2017/0104817 | A1 | 4/2017 | Zahid et al. |
| 2017/0187629 | A1 | 6/2017 | Shalev |
| 2017/0237659 | A1 | 8/2017 | Birrittella et al. |
| 2017/0257315 | A1 | 9/2017 | Johnsen et al. |
| 2017/0302573 | A1 | 10/2017 | Chen et al. |
| 2018/0026878 | A1 | 1/2018 | Zahavi et al. |
| 2018/0076976 | A1 | 3/2018 | Chhabra et al. |

FOREIGN PATENT DOCUMENTS

| | | |
|---|---|---|
| JP | 2016119654 | 6/2016 |
| JP | 2017525279 | 8/2017 |
| KR | 20150009550 | 1/2015 |
| WO | 2015017145 | 2/2015 |
| WO | 2016007760 | 1/2016 |

OTHER PUBLICATIONS

Bogdanski, et al., "Making the Network Scalable: Inter-subnet Routing in InfiniBand", Aug. 26, 2013, pp. 685-698, 14 pages.
United States Patent and Trademark Office, Office Action dated Oct. 21, 2020 for U.S. Appl. No. 16/834,623, 24 pages.
Chinese Patent Office, Office Action dated Dec. 3, 2020 for Chinese Patent Application No. 201780002951.4, 3 pages.
Indian Patent Office, First Examination Report dated Dec. 14, 2020 for Indian Patent Application No. 2018047023744, 7 pages.

(56) References Cited

OTHER PUBLICATIONS

Japanese Patent Office, Office Action dated Dec. 22, 2020 for Japanese Patent Application No. 2018-510374, 4 pages.
United States Patent and Trademark Office, Office Action dated Oct. 3, 2018 for U.S. Appl. No. 15/656,856, 20 pages.
United States Patent and Trademark Office, Office Action dated Oct. 3, 2018 for U.S. Appl. No. 15/656,857, 20 pages.
United States Patent and Trademark Office, Office Action dated Oct. 4, 2018 for U.S. Appl. No. 15/656,977, 24 pages.
United States Patent and Trademark Office, Office Action dated Oct. 5, 2018 for U.S. Appl. No. 15/656,981, 31 pages.
United States Patent and Trademark Office, Office Action dated May 3, 2019 for U.S. Appl. No. 15/656,949, 17 pages.
United States Patent and Trademark Office, Office Action dated Jun. 3, 2019 for U.S. Appl. No. 15/656,955, 18 pages.
United States Patent and Trademark Office, Office Action dated Jun. 14, 2019 for U.S. Appl. No. 15/656,951, 18 pages.
United States Patent and Trademark Office, Office Action dated Aug. 7, 2019 for U.S. Appl. No. 15/656,968, 28 pages.
United States Patent and Trademark Office, Office Action dated Aug. 7, 2019 for U.S. Appl. No. 16/230,167, 42 pages.
Communication pursuant to Article 94(3) EPC dated Aug. 9, 2019 for European Patent Application No. 17704622.4, 3 pages.
United States Patent and Trademark Office, Notice of Allowance dated Aug. 29, 2019 for U.S. Appl. No. 15/656,949, 10 pages.
United States Patent and Trademark Office, Office Action dated Sep. 19, 2019 for U.S. Appl. No. 15/656,962, 12 pages.
United States Patent and Trademark Office, Notice of Allowance dated Nov. 26, 2019 for U.S. Appl. No. 15/656,968, 9 pages.
United States Patent and Trademark Office, Notice of Allowance dated Dec. 11, 2019 for U.S. Appl. No. 15/656,951, 10 pages.
United States Patent and Trademark Office, Notice of Allowance dated Jan. 8, 2020 for U.S. Appl. No. 15/656,955, 17 pages.
United States Patent and Trademark Office, Notice of Allowance dated Jan. 16, 2020 for U.S. Appl. No. 15/656,962, 11 pages.
United States Patent and Trademark Office, Notice of Allowance dated Aug. 11, 2020 for U.S. Appl. No. 16/230,167, 13 pages.
United States Patent and Trademark Office, Office Action dated May 26, 2021 for U.S. Appl. No. 16/703,457, 13 Pages.
United States Patent and Trademark Office, Notice of Allowance and Fee(s) Due dated Apr. 1, 2021 for U.S. Appl. No. 16/834,623, 12 Pages.
United States Patent and Trademark Office, Notice of Allowance and Fee(s) Due dated for U.S. Appl. No. 16/850,319, 10 Pages.
Japanese Patent Office, Office Action dated May 18, 2021 for Japanese Patent Application No. 2018-510374, 8 pages.
Japanese Patent Office, Decision to Grant a Patent dated Jul. 13, 2021 for Japanese Patent Application No. 2018-541609, 2 pages.
Chinese National Intellectual Property Administration, Notification of the First Office Action dated Jul. 2, 2021 for Chinese Patent Application No. 201780010773.X, 10 pages.
United States Patent and Trademark Office, Office Action dated Jul. 23, 2021 for U.S. Appl. No. 16/802,233, 22 pages.
United States Patent and Trademark Office, Notice of Allowance and Fee(s) Due dated Sep. 15, 2021 for U.S. Appl. No. 16/703,457, 22 pages.
United States Patent and Trademark Office, Office Communication dated Jan. 10, 2022 for U.S. Appl. No. 16/802,233, 24 pages.
China National Intellectual Property Administration, Notification of Second Office Action dated Mar. 1, 2022 for Chinese Patent Application No. 201780010773.X, 9 pages.
European Patent Office, Decision to Refuse a European Patent application dated Feb. 14, 2022 for European Patent Application No. 17758745.8, 14 pages.
United States Patent and Trademark Office, Notice of Allowance and Fee(s) Due dated Jun. 28, 2022 for U.S. Appl. No. 16/802,233, 16 pages.
Japanese Patent Office, Notice of Reasons for Refusal dated Nov. 8, 2022 for Japanese Patent Application No. 2021-164659, 4 pages.
Japanese Patent Office, Notice of Reasons for Refusal dated Oct. 11, 2022 for Japanese Patent Application No. 2021-131306, 12 pages.
Japan Patent Office, Decision to Grant a Patent dated Apr. 14, 2023 for Japanese Patent Application No. 2021-131306, 5 pages.
Japan Patent Office, Decision to Grant a Patent dated Jan. 30, 2023 for Japanese Patent Application No. 2021-164659, 5 pages.

* cited by examiner

SYSTEM AND METHOD FOR SUPPORTING FAST HYBRID RECONFIGURATION IN A HIGH PERFORMANCE COMPUTING ENVIRONMENT

CLAIM OF PRIORITY AND CROSS-REFERENCE TO RELATED APPLICATIONS

This application is a continuation of and claims the benefit of priority to U.S. Patent Application entitled "SYSTEM AND METHOD FOR SUPPORTING FAST HYBRID RECONFIGURATION IN A HIGH PERFORMANCE COMPUTING ENVIRONMENT", application Ser. No. 16/040,114, filed Jul. 19, 2018, which application is a continuation of and claims priority to U.S. Patent Application entitled "SYSTEM AND METHOD FOR SUPPORTING FAST HYBRID RECONFIGURATION IN A HIGH PERFORMANCE COMPUTING ENVIRONMENT", application Ser. No. 15/891,183, filed Feb. 7, 2018, which application is a continuation of and claims of priority to U.S. Patent Application entitled "SYSTEM AND METHOD FOR SUPPORTING FAST HYBRID RECONFIGURA-TION IN A HIGH PERFORMANCE COMPUTING ENVI-RONMENT", application Ser. No. 15/680,463, filed on Aug. 18, 2017, which application claims the benefit of priority to U.S. Provisional Patent Application entitled "SYSTEM AND METHOD FOR SUPPORTING FAST HYBRID RECONFIGURATION IN A HIGH PERFORMANCE COMPUTING ENVIRONMENT", Application No. 62/378, 583, filed on Aug. 23, 2016; and is related to: U.S. Patent entitled "SYSTEM AND METHOD FOR SUPPORTING SUB-SUBNET IN AN INFINIBAND (IB) NETWORK", U.S. Pat. No. 8,743,890, issued on Jun. 3, 2014; U.S. Patent entitled "SYSTEM AND METHOD FOR SUPPORTING SUB-SUBNET IN AN INFINIBAND (IB) NETWORK", U.S. Pat. No. 9,219,718, issued on Dec. 22, 2015; and U.S. Patent Application entitled "SYSTEM AND METHOD FOR USING SUBNET PREFIX VALUES IN GLOBAL ROUTE HEADER (GRH) FOR LINEAR FORWARDING TABLE (LFT) LOOKUP IN A HIGH PERFORMANCE COMPUTING ENVIRONMENT", application Ser. No. 15/416,642, filed on Jan. 27, 2017, which applications are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting computer system virtualization and live migration using SR-IOV vSwitch architecture.

BACKGROUND

As larger cloud computing architectures are introduced, the performance and administrative bottlenecks associated with the traditional network and storage have become a significant problem. There has been an increased interest in using InfiniBand (IB) technology as the foundation for a cloud computing fabric. This is the general area that embodiments of the invention are intended to address.

SUMMARY

In accordance with an embodiment, systems and methods can provide for performance-driven reconfiguration in large-scale lossless networks. A hybrid reconfiguration scheme can allow for fast partial network reconfiguration with different routing algorithms of choice in different subparts of the network. Partial reconfigurations can be orders of magnitude faster than the initial full configuration, thus making it possible to consider performance-driven reconfigurations in lossless networks. A proposed mechanism takes advantage of the fact that large HPC systems and clouds are shared by multiple tenants (e.g., different tenants on different partitions) running isolated tasks. In such scenarios tenant inter-communication is not allowed, thus the workload deployment and placement scheduler should try to avoid fragmentation to ensure efficient resource utilization. That is, the majority of the traffic per tenant can be contained within consolidated subparts of the network, the SM can reconfigure certain subparts in order to improve the overall performance. The SM can use the Fat-Tree topology and the Fat-Tree routing algorithm. Such a hybrid reconfiguration scheme can successfully reconfigure and improve performance within sub-trees by using a custom Fat-Tree routing algorithm that uses a provided node ordering to reconfigure the network. When the SM wants to reconfigure the whole network, the SM can use the default Fat-Tree routing algorithm, effectively exhibiting the combination of two different routing algorithms for different use-cases in a single subnet.

In accordance with an embodiment, an exemplary method for supporting fast hybrid reconfiguration in a high performance computing environment can provide, at one or more microprocessors, a first subnet, the first subnet comprising a plurality of switches, the plurality of switches comprising at least a leaf switch, wherein each of the plurality of switches comprising a plurality of switch ports, a plurality of host channel adapters, each host channel adapter comprising at least one host channel adapter port, and a plurality of end nodes, wherein each of the plurality of end nodes are associated with at least one host channel adapter of the plurality of host channel adapters. The method can arrange the plurality of switches of the first subnet in a network architecture having a plurality of levels, each of the plurality of levels comprising at least one switch of the plurality of switches. The method can configure the plurality of switches according to a first configuration method, the first configuration method being associated with a first ordering of the plurality of end nodes. The method can configure a subset of the plurality of switches as a sub-subnet of the first subnet, the sub-subnet of the first subnet comprising a number of levels fewer than the plurality of levels of the first subnet. The method can then reconfigure the sub-subnet of the first subnet according to a second configuration method.

DETAILED DESCRIPTION

Figure 1:
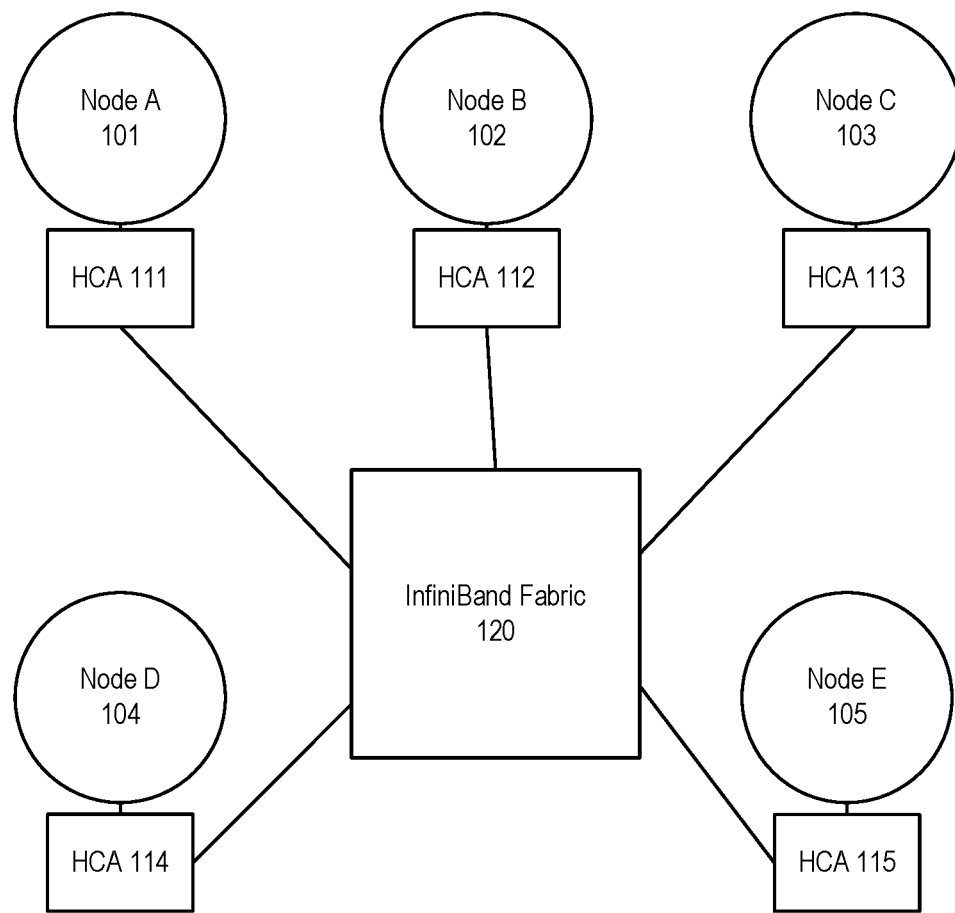
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods supporting fast hybrid reconfiguration in a high performance computing environment.

The following description of the invention uses an InfiniBand™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated subnet device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, inter- and intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

In accordance with an embodiment, IB networks can support partitioning (i.e., supporting multiple tenants) as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P Keys). The SM can also configure switches and routers with the partition enforcement tables containing P Key information associated with the LIDs. Additionally, in a general case, partition membership of a switch port can represent a union of all membership indirectly associated with LIDs routed via the port in an egress (towards the link) direction.

In accordance with an embodiment, for the communication between nodes, Queue Pairs (QPs) and End-to-End contexts (EECs) can be assigned to a particular partition, except for the management Queue Pairs (QP0 and QP1). The P Key information can then be added to every IB transport packet sent. When a packet arrives at an HCA port or a switch, its P Key value can be validated against a table configured by the SM. If an invalid P Key value is found, the packet is discarded immediately. In this way, communication is allowed only between ports sharing a partition.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, to achieve live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 2:
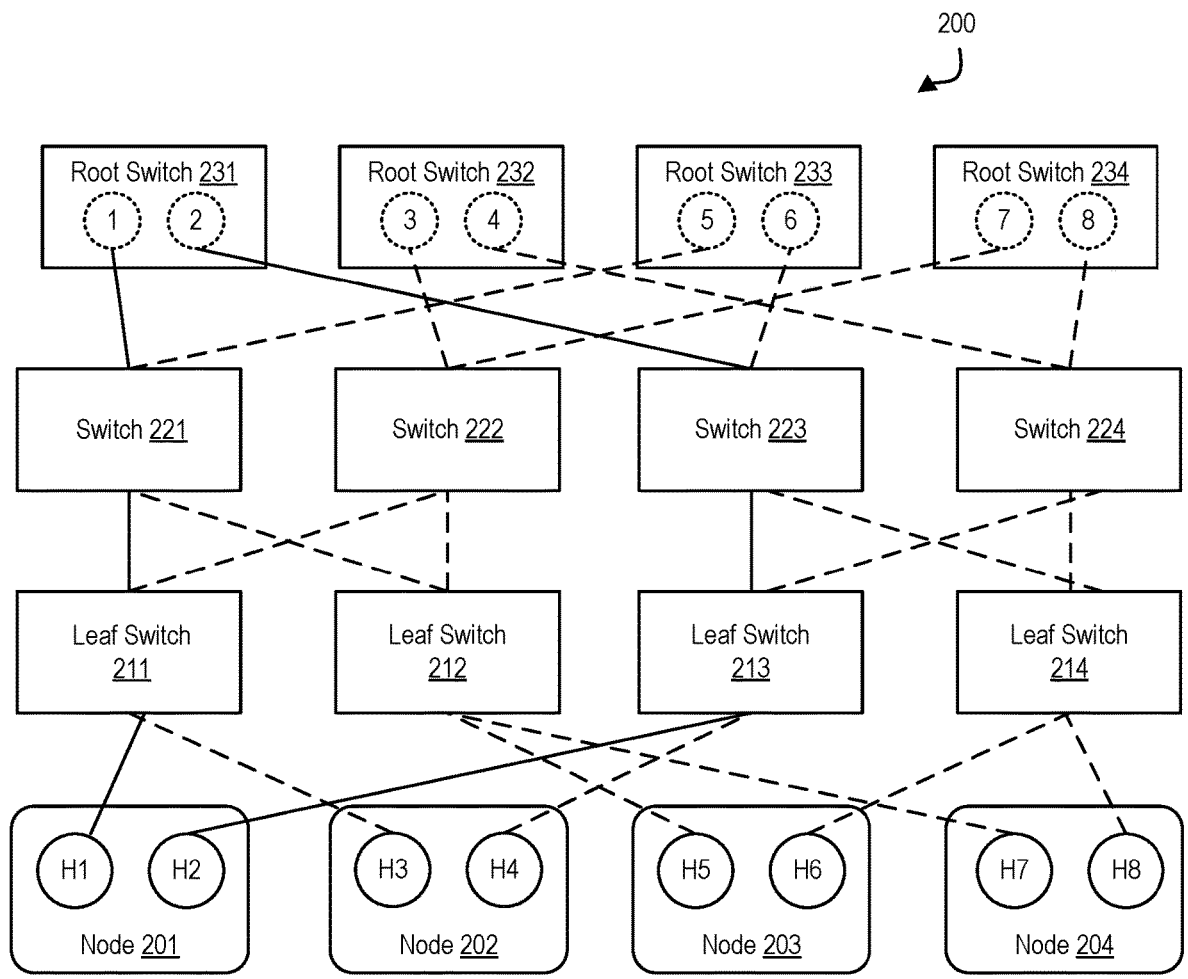
FIG. 2 shows an illustration of a tree topology in a network environment, in accordance with an embodiment.

FIG. 2 shows an illustration of a tree topology in a network environment, in accordance with an embodiment. As shown in FIG. 2, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 2, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing is done oblivious to the partitions, fat-tree routed subnets, in general, provide poor isolation among partitions.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model and a virtual switch model.

Figure 3:
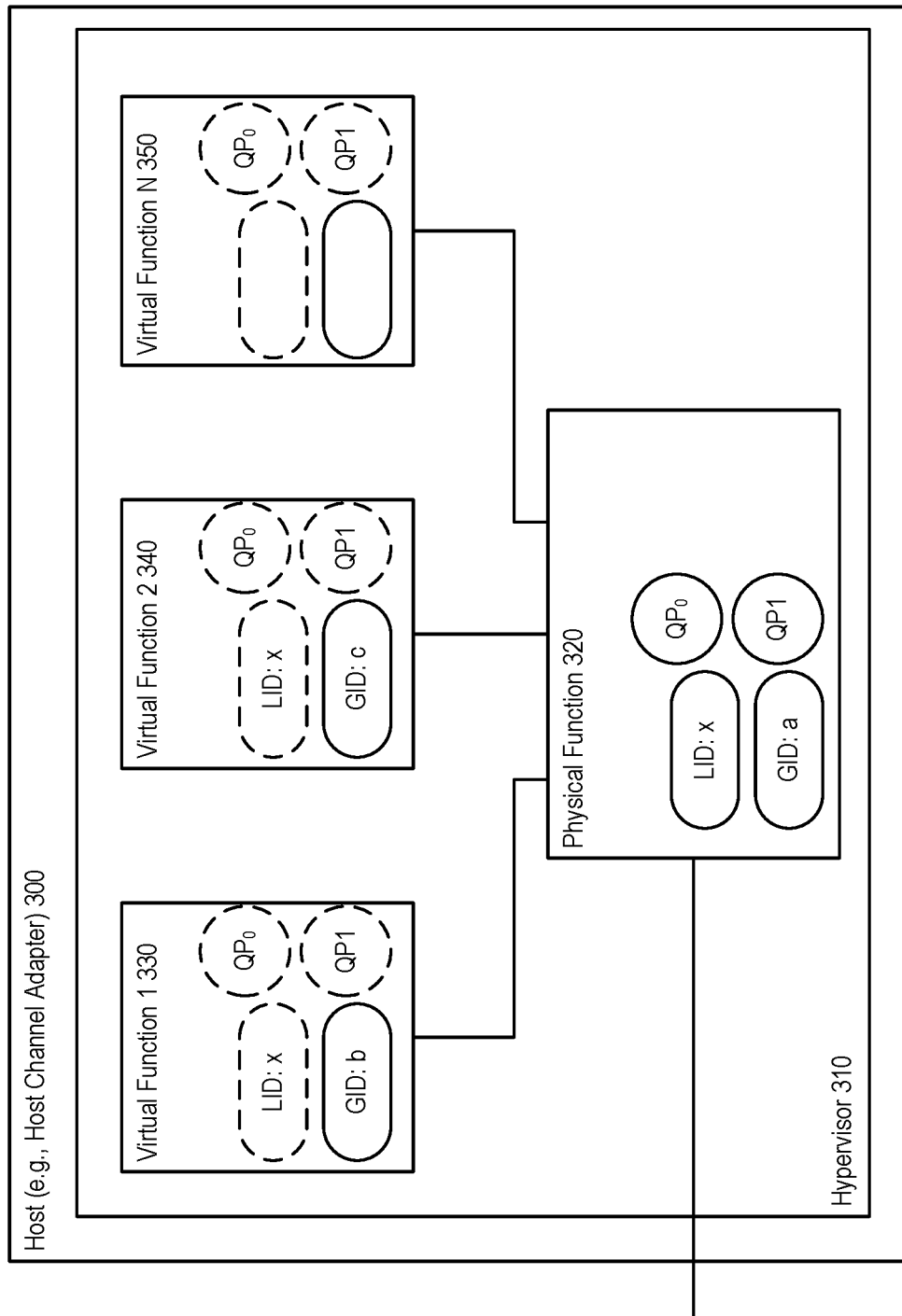
FIG. 3 shows an exemplary shared port architecture, in accordance with an embodiment.

FIG. 3 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 3, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 3, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

There can be different types of SR-IOV models, e.g. a shared port model and a virtual switch model.

Figure 4:
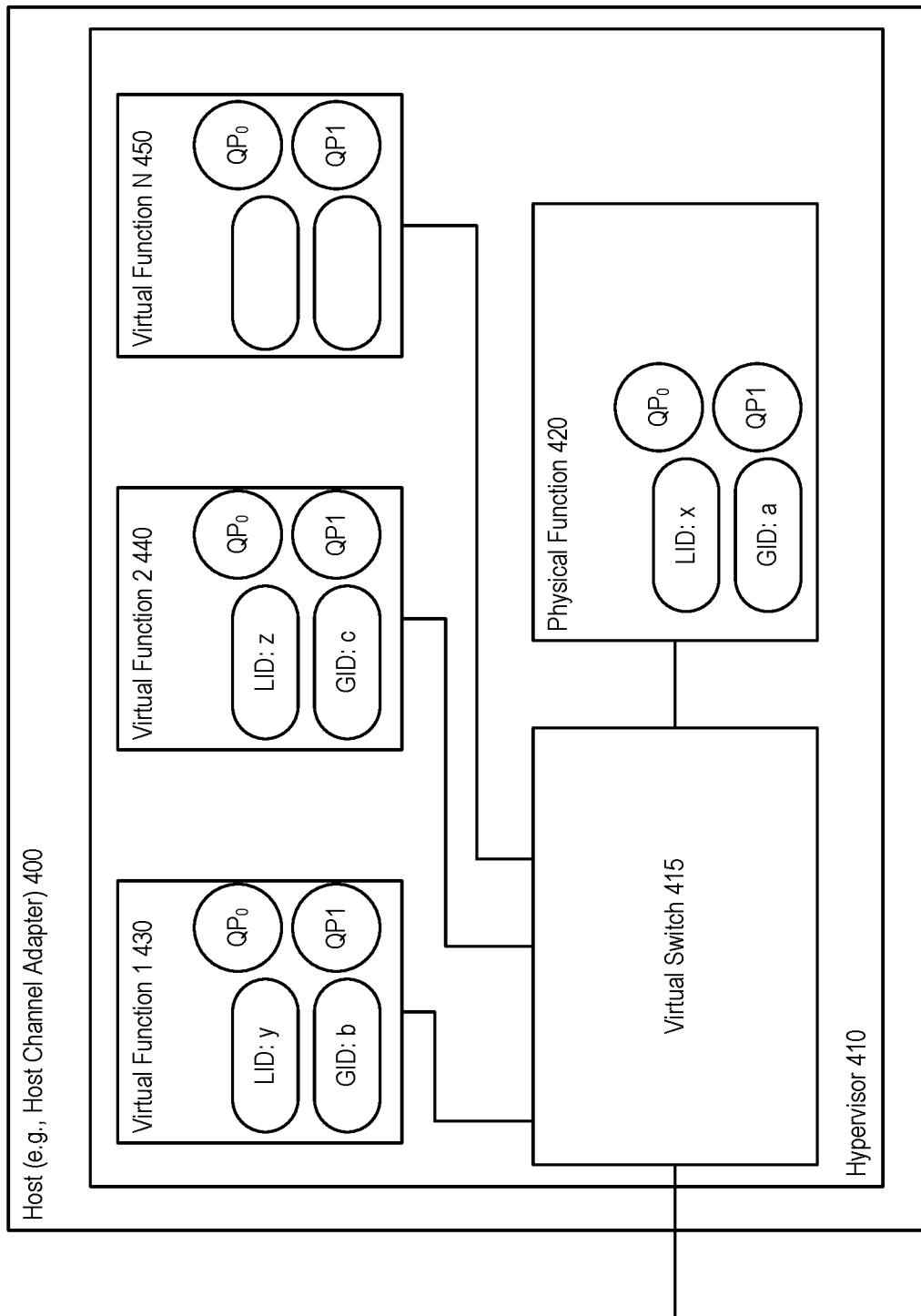
FIG. 4 shows an exemplary vSwitch architecture, in accordance with an embodiment.

FIG. 4 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—vSwitch with Prepopulated LIDs

In accordance with an embodiment, the present disclosure provides a system and method for providing a vSwitch architecture with prepopulated LIDs.

Figure 5:
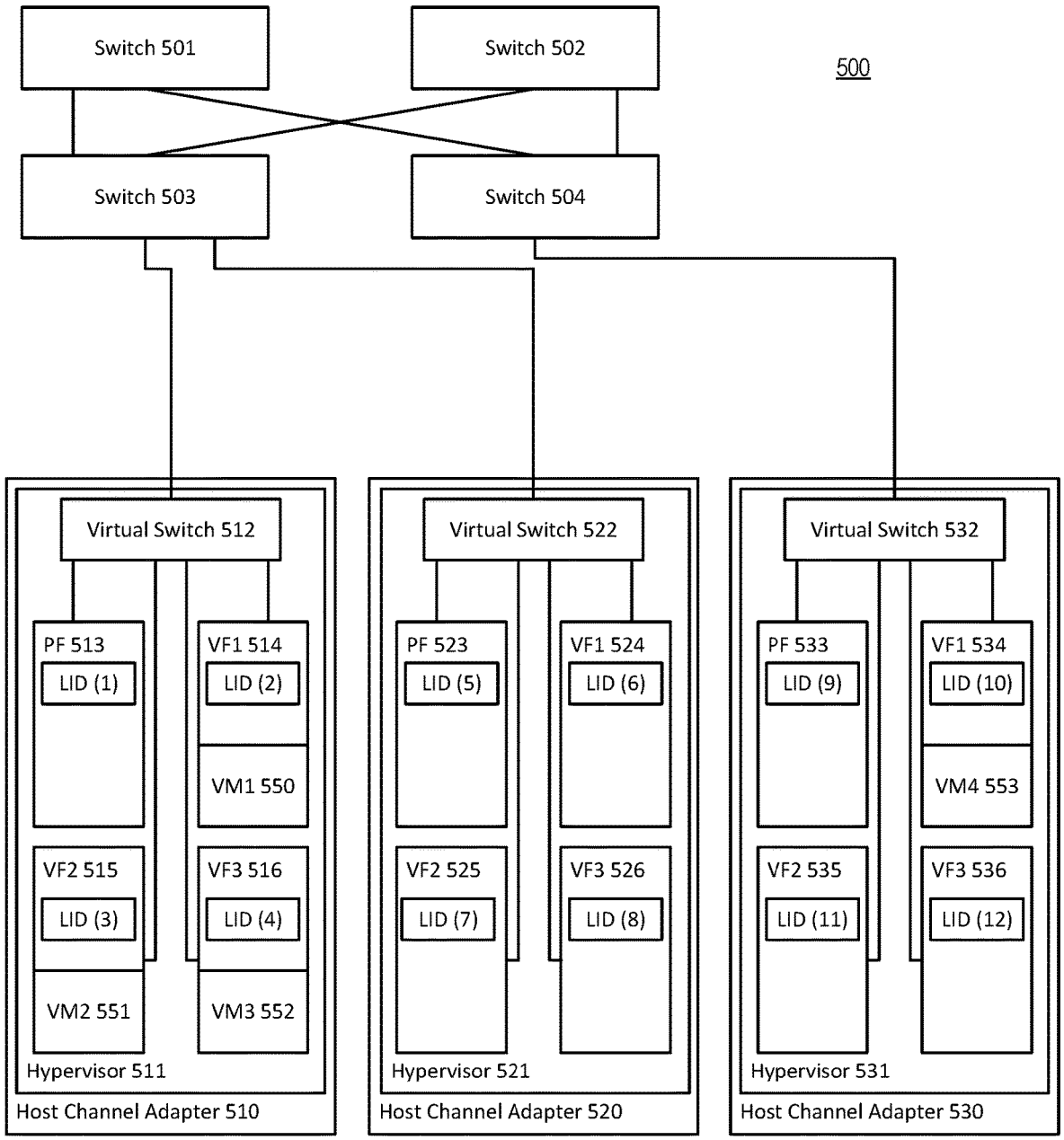
FIG. 5 shows an exemplary vSwitch architecture with prepopulated LIDs, in accordance with an embodiment.

FIG. 5 shows an exemplary vSwitch architecture with prepopulated LIDs, in accordance with an embodiment. As depicted in the figure, a number of switches 501-504 can provide communication within the network switched environment 500 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, each of the switches 501-504 can comprise a number of ports (not shown), which are used in setting a linear forwarding table in order to direct traffic within the network switched environment 500.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 5, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 5.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an dadditional LID as it can share the LID with the PF In accordance with an embodiment, in a vSwitch architecture with prepopulated LIDs, communication paths are computed for all the LIDs once when the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID-Mask-Control-like (LMC-like) feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 6:
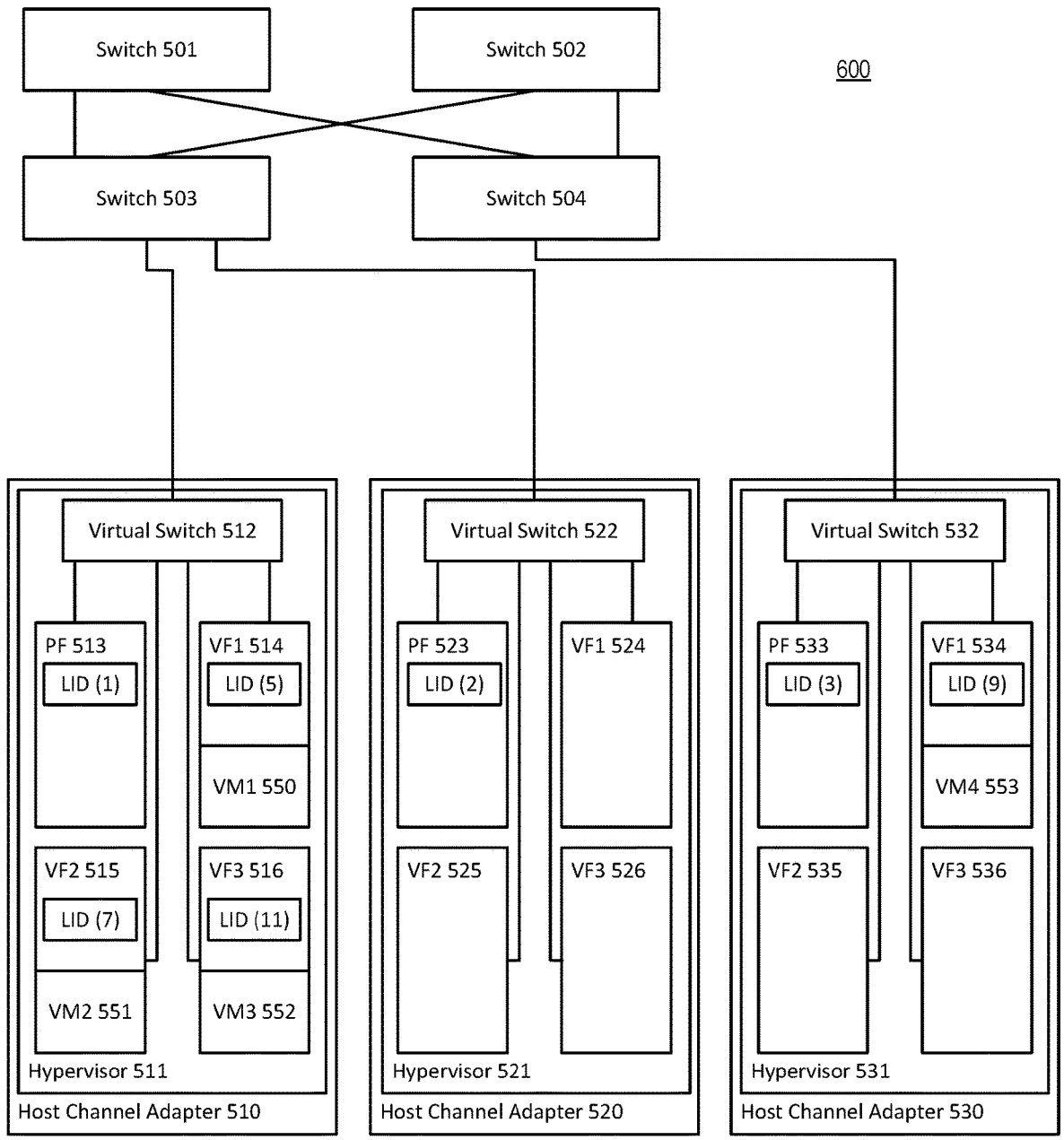
FIG. 6 shows an exemplary vSwitch architecture with dynamic LID assignment, in accordance with an embodiment.

FIG. 6 shows an exemplary vSwitch architecture with dynamic LID assignment, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 6, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and virtual function 9 being assigned to virtual function 1 535. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet can be updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 7:
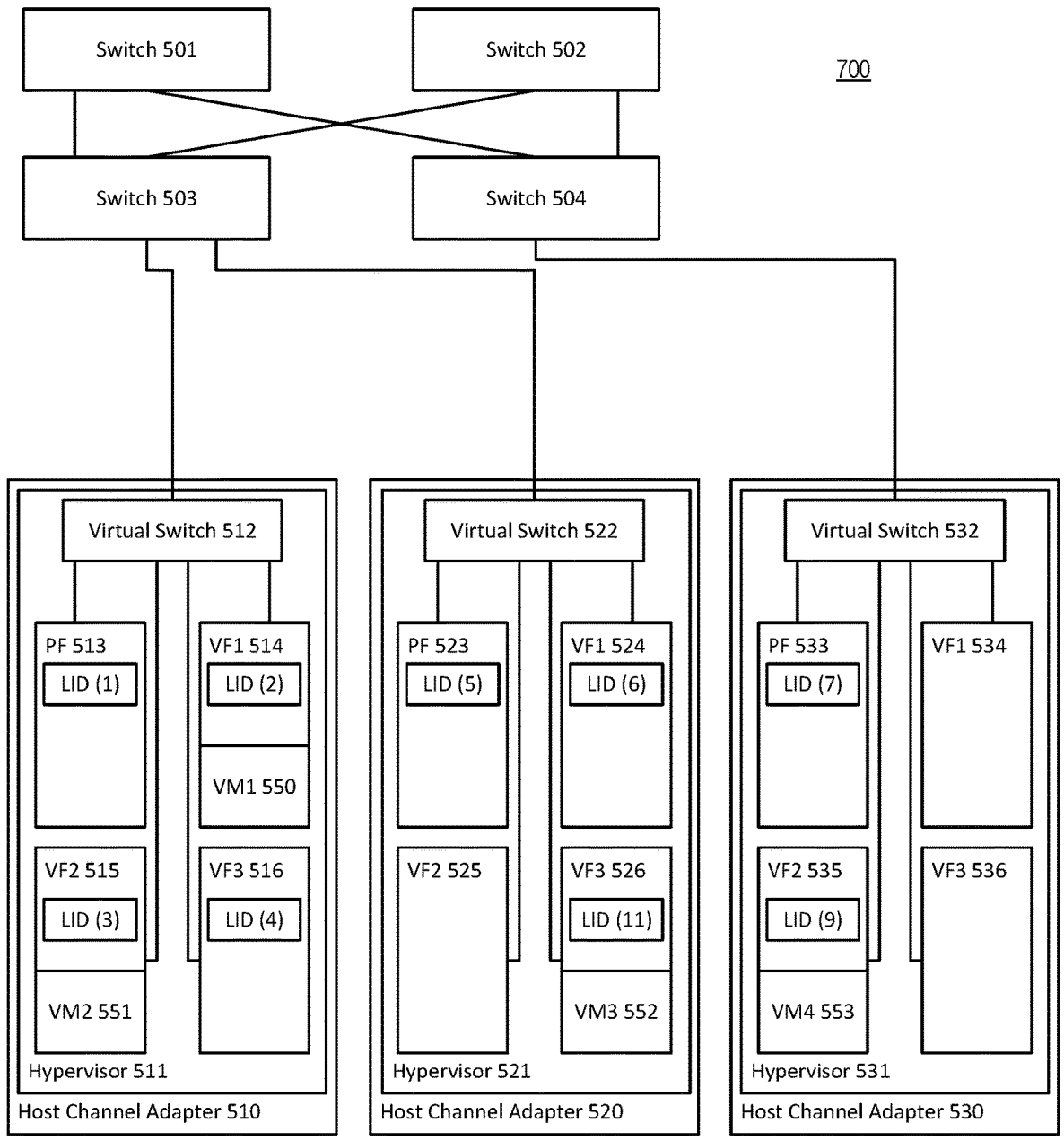
FIG. 7 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 7 shows an exemplary vSwitch architecture with vSwitch with dynamic LID assignment and prepopulated LIDs, in accordance with an embodiment. As depicted in the figure, a number of switches 501-504 can provide communication within the network switched environment 500 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 7, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 7, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

Fast Hybrid Reconfiguration

In accordance with an embodiment, High Performance Computing (HPC) clusters are massively parallel systems that consist of thousands of nodes and millions of cores. Traditionally, such systems are associated with the scientific community and can be used to run complex and high granularity computations. However, with the emergence of the cloud computing paradigm and Big-Data analytics, the computer science society tends to agree that there will be a convergence of HPC and Big-Data, with the Cloud being the vehicle for delivering the associated services to a broader audience. Large conventional HPC clusters are environments usually shared between users that run diversified, but predictable workloads. When exposed to the cloud and the more dynamic pay-as-you-go model however, the workload and utilization of the system can become unpredictable, leading to the need for performance optimizations during runtime.

In accordance with an embodiment, one of the components that can be tuned and reconfigured in order to improve performance is the underlying interconnection network. The interconnection network is a critical part in massively parallel architectures due to the intensive communication between nodes. As such, high performance network technologies that typically employ lossless layer-two flow control are used, as these technologies provide significantly better performance. Nevertheless, the performance comes at a cost of added complexity and management cost, and reconfiguring the network can be challenging. Since packets are not getting dropped in lossless networks, deadlocks may occur if loops are allowed to form by the routing function. A Subnet Manager (SM) software is committed to administer the network. Among other tasks, this SM is responsible to compute deadlock-free communication paths between nodes in the network, and distribute the corresponding Linear Forwarding Tables (LFTs) to the switches. When a reconfiguration is needed, the SM recalculates a new set of deadlock-free routes. During the transition phase, however, when distributing the new LFTs, a new routing function $R_{new}$ coexists with the old routing function $R_{old}$. Although $R_{old}$ and $R_{new}$ are both deadlock-free, the combination of both might be not. Moreover, the path computation is the costlier phase of a reconfiguration and can take up to several minutes, depending on the topology and the chosen routing function, introducing an obstacle that renders the reconfiguration to an extravagant operation that is avoided unless severe faults occur. In the case of faults, the reconfiguration is kept minimal in order to reestablish deadlock-free connectivity quickly, at the cost of degrading the performance.

In accordance with an embodiment, systems and methods can provide for performance-driven reconfiguration in large-scale lossless networks. A hybrid reconfiguration scheme can allow for fast partial network reconfiguration with different routing algorithms of choice in different subparts of the network. Partial reconfigurations can be orders of magnitude faster than the initial full configuration, thus making it possible to consider performance-driven reconfigurations in lossless networks. A proposed mechanism takes advantage of the fact that large HPC systems and clouds are shared by multiple tenants (e.g., different tenants on different partitions) running isolated tasks. In such scenarios tenant inter-communication is not allowed, thus the workload deployment and placement scheduler should try to avoid fragmentation to ensure efficient resource utilization. That is, the majority of the traffic per tenant can be contained within consolidated subparts of the network, the SM can reconfigure certain subparts in order to improve the overall performance. The SM can use the Fat-Tree topology and the Fat-Tree routing algorithm. Such a hybrid reconfiguration scheme can successfully reconfigure and improve performance within sub-trees by using a custom Fat-Tree routing algorithm that uses a provided node ordering to reconfigure the network. When the SM wants to reconfigure the whole network, the SM can use the default Fat-Tree routing algorithm, effectively exhibiting the combination of two different routing algorithms for different use-cases in a single subnet.

In accordance with an embodiment, the Fat-Tree routing algorithm (FTree) is a topology-aware routing algorithm for Fat-Tree topologies. FTree first discovers the network topology and each switch is marked with a tuple that identifies its location in the topology. Each tuple is a vector of values in the form of $(l, a_h, \ldots, a_1)$, where l represents the level where the switch is located. The $a_h$ represents the switch index within the top-most sub-tree, and recursively the digits $a_{h-1}$ until $a_1$ represent the index of the sub-tree within that first sub-tree and so on. For a Fat-Tree with n levels, the root-level (topmost or core) switches are located in level l=0, whereas the leaf switches (where nodes are connected to), are located in level l=n−1. The tuple assignment for an example 2-ary-4-tree is shown in FIG. 8.

Figure 8:
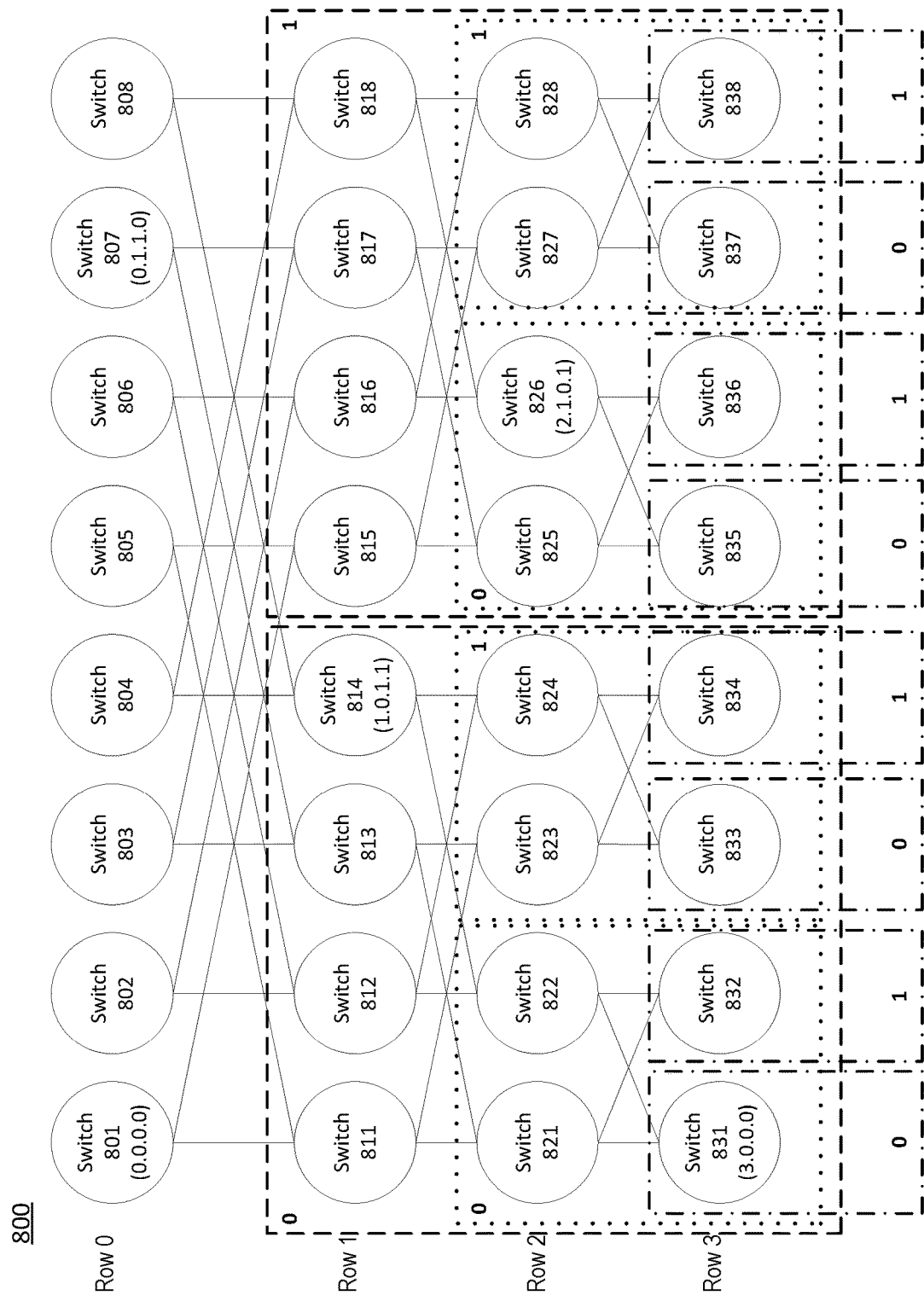
FIG. 8 illustrates switch tuples, in accordance with an embodiment.

FIG. 8 illustrates switch tuples, in accordance with an embodiment. More specifically, the figure illustrates switch tuples as allocated by the OpenSM's Fat-Tree routing algorithm implemented for an example Fat-Tree, XGFT(4; 2, 2, 2, 2; 2, 2, 2, 1). The Fat-Tree 800 can comprise switches 801-808, 811-818, 921-1428, and 831-838. As the Fat-Tree has n=4 switch levels (marked as row 0 at the root level, until row 3 at the leaf level), the Fat-Tree is composed of $m_1$=2 first-level sub-trees with n'=n−1=3 switch levels each. This is shown in the figure by two boxes defined by a dashed line that enclose the switches from levels 1 to 3, each first-level sub-tree receiving an identifier of 0 or 1. Each of those first-level sub-trees is composed of $m_2$=2 second-level sub-trees with n"=n'−1=2 switch levels each above the leaf switches. This is shown in the figure by four boxes defined by a dotted line that enclose the switches from levels 2 to 3, each second-level sub-tree receiving an identifier of 0 or 1. Similarly, each of the leaf switches can also be considered as a sub-tree, shown in the figure by eight boxes defined by a dash-dot line, and each of these sub trees receiving an identifier of 0 or 1.

In accordance with an embodiment, and as exemplified in the figure, tuples, such as four-number tuples, can be assigned to the various switches, each number of the tuple indicating a specific sub-tree correspondence for the position of each value in the tuple. For example, switch 814 (which can be referred to as Switch 1_3) can be assigned with tuple 1.0.1.1, representing its location at level 1 and 0th first-level sub-tree.

In accordance with an embodiment, once the tuples have been assigned, FTree iterates through each leaf-switch in an ascending tuple order, and for each downward switch port where nodes are connected in an ascending port-order the algorithm routes the selected nodes based on their LID. FIGS. 9-13 illustrate different phases of how a node is routed, in accordance with an embodiment.

Figure 9:
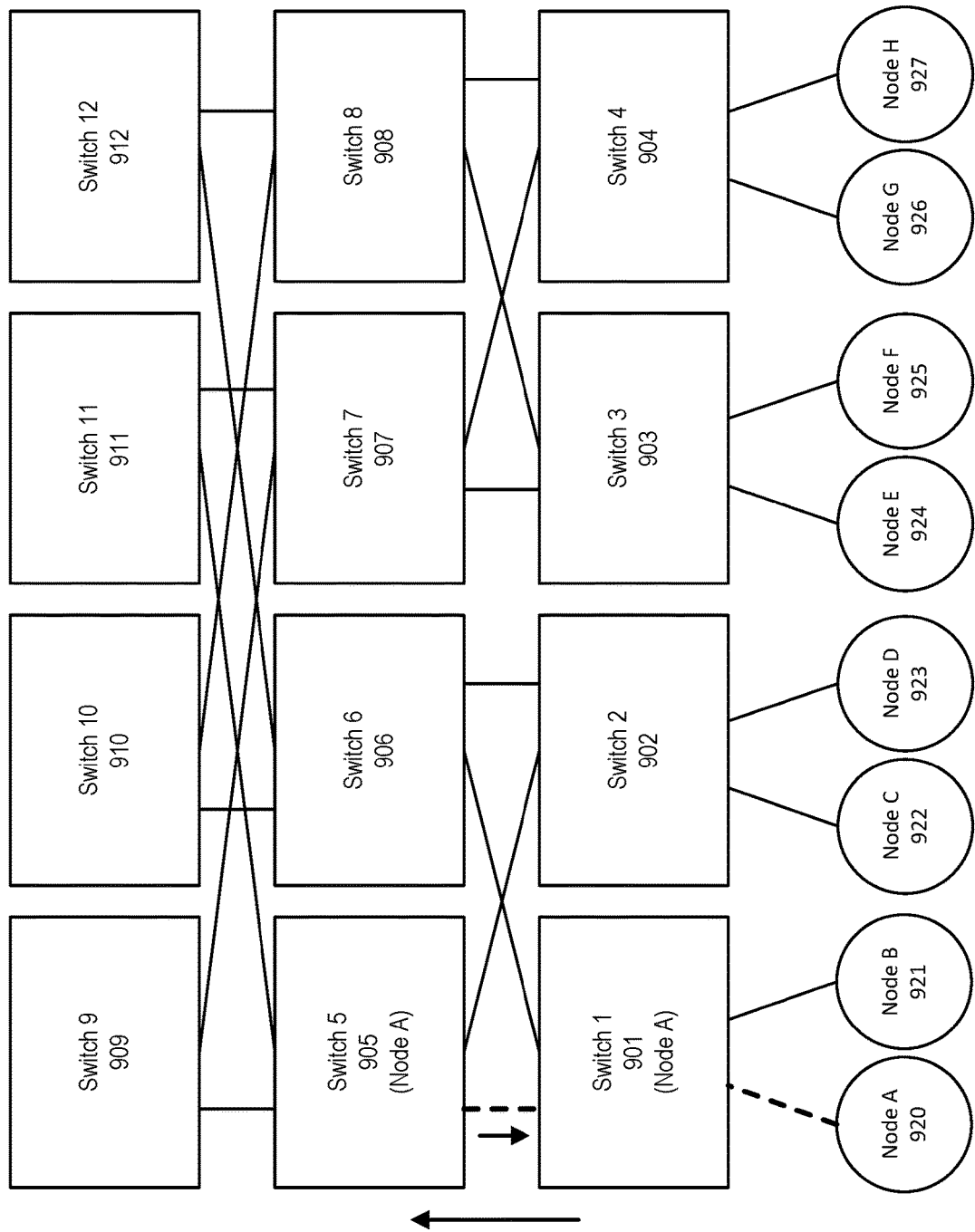
FIG. 9 shows a system for a phase of node routing, in accordance with an embodiment.

FIG. 9 shows a system for a phase of node routing, in accordance with an embodiment. Switches 901-912 in the figure are marked with numbers from 1-12. Each switch can comprise a plurality of ports (not shown). For example, each switch can comprise 32 ports—16 down and 16 up. Each of switches 1, 2, 3, 4, can also be linked to two or more nodes, such as nodes A and B 920 and 921 linked to switch 1, nodes C and D 922 and 923 linked to switch 2, node E and F 924 and 925 linked to switch 3, and nodes G and H 926 and 927 linked to switch 4. FTree keeps port-usage counters for balancing the routes and starts by traversing the fabric upwards from the least loaded port while choosing the routes downwards. As shown in the figure, in the first iteration all port counters are zero, so the first available upward port is chosen. For each level up, the newly reached switch, in this case, switch 5 905, is selected as the switch to route all the traffic downwards towards the routed node (Node A 920) from the incoming port which through the switch was reached. The dashed lines in the figure represent routes that have been assigned to node A.

Figure 10:
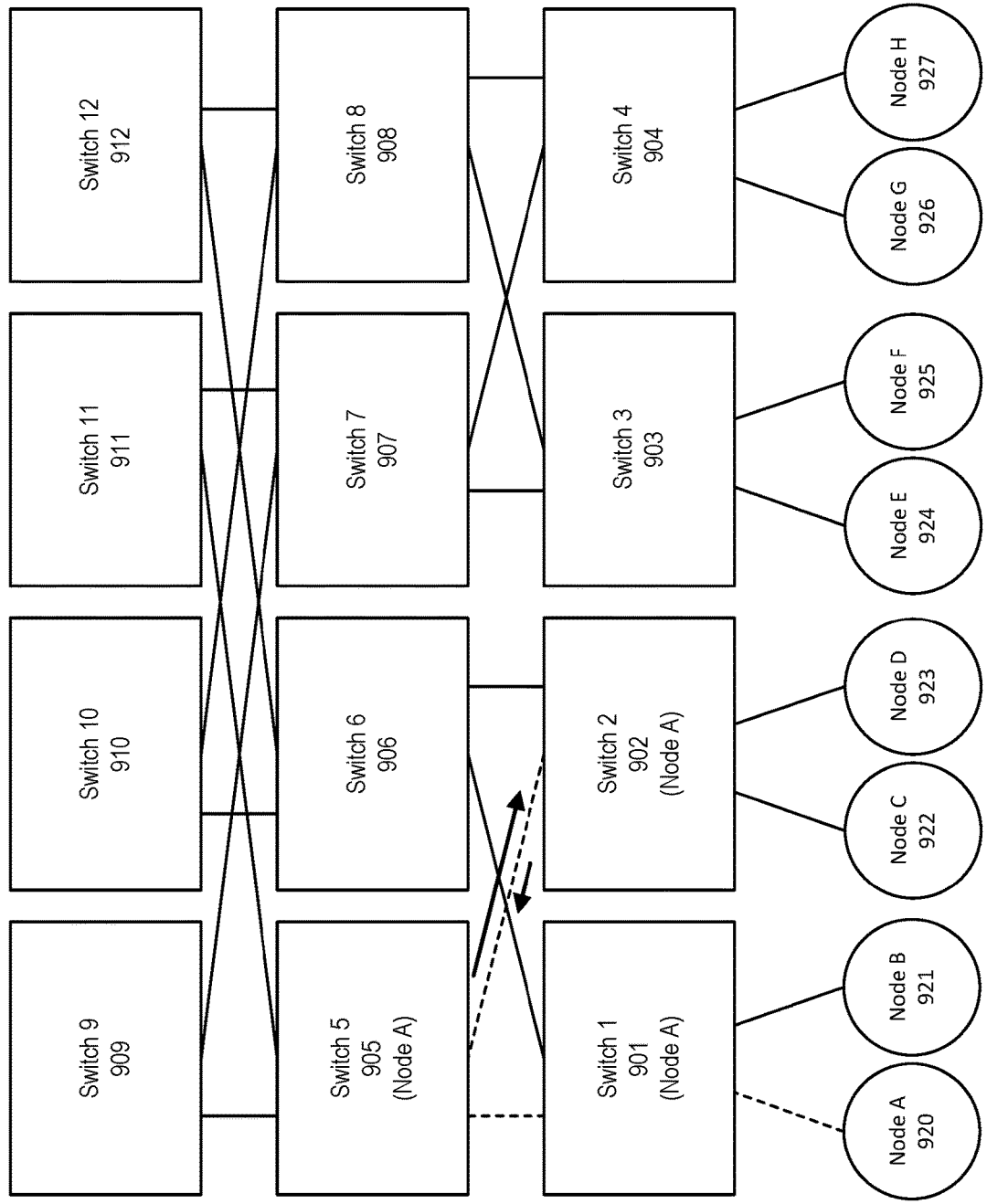
FIG. 10 shows a system for a phase of node routing, in according with an embodiment.

FIG. 10 shows a system for a phase of node routing, in according with an embodiment. Switches 901-912 in the figure are marked with numbers from 1-12. Each switch can comprise a plurality of ports (not shown). For example, each switch can comprise 32 ports—16 down and 16 up. Each of switches 1, 2, 3, 4, can also be linked to two or more nodes, such as nodes A and B 920 and 921 linked to switch 1, nodes C and D 922 and 923 linked to switch 2, node E and F 924 and 925 linked to switch 3, and nodes G and H 926 and 927 linked to switch 4. FTree can, after the routing step shown in FIG. 9, traverse the fabric downwards and assign routes upwards towards the switch in a similar manner. This is shown in the figure as the long arrow going from switch 5 to switch 2 representing the routing algorithm. Then, the route assignment proceeds in an upward manner, going from switch 2 to switch 5. The dashed lines in the figure represent routes that have been assigned to node A.

Figure 11:
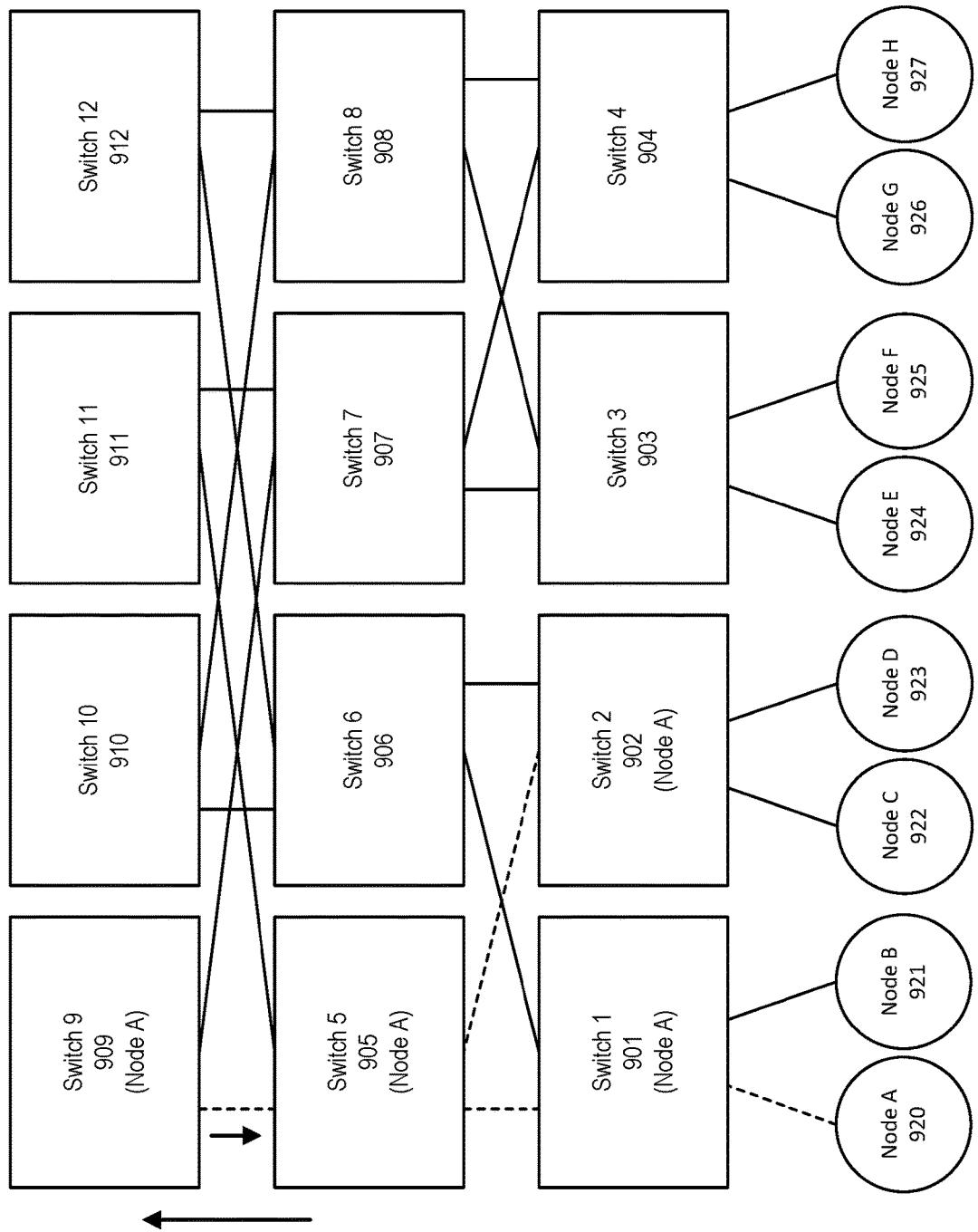
FIG. 11 shows a system for a phase of node routing, in according with an embodiment.

FIG. 11 shows a system for a phase of node routing, in accordance with an embodiment. Switches 901-912 in the figure are marked with numbers from 1-12. Each switch can comprise a plurality of ports (not shown). For example, each switch can comprise 32 ports—16 down and 16 up. Each of switches 1, 2, 3, 4, can also be linked to two or more nodes, such as nodes A and B 920 and 921 linked to switch 1, nodes C and D 922 and 923 linked to switch 2, node E and F 924 and 925 linked to switch 3, and nodes G and H 926 and 927 linked to switch 4. A same or similar recursive operation as described in FIGS. 9 and 10 continues until route entries for the selected node have been added to all of the necessary switches in the fabric. As shown in FIG. 11, a route down by going up operation is as depicted. As the FTree mechanism traverses up the tree (from switch 5 to switch 9), a route is assigned to Node A between switch 9 and switch 5 (route down).

Figure 12:
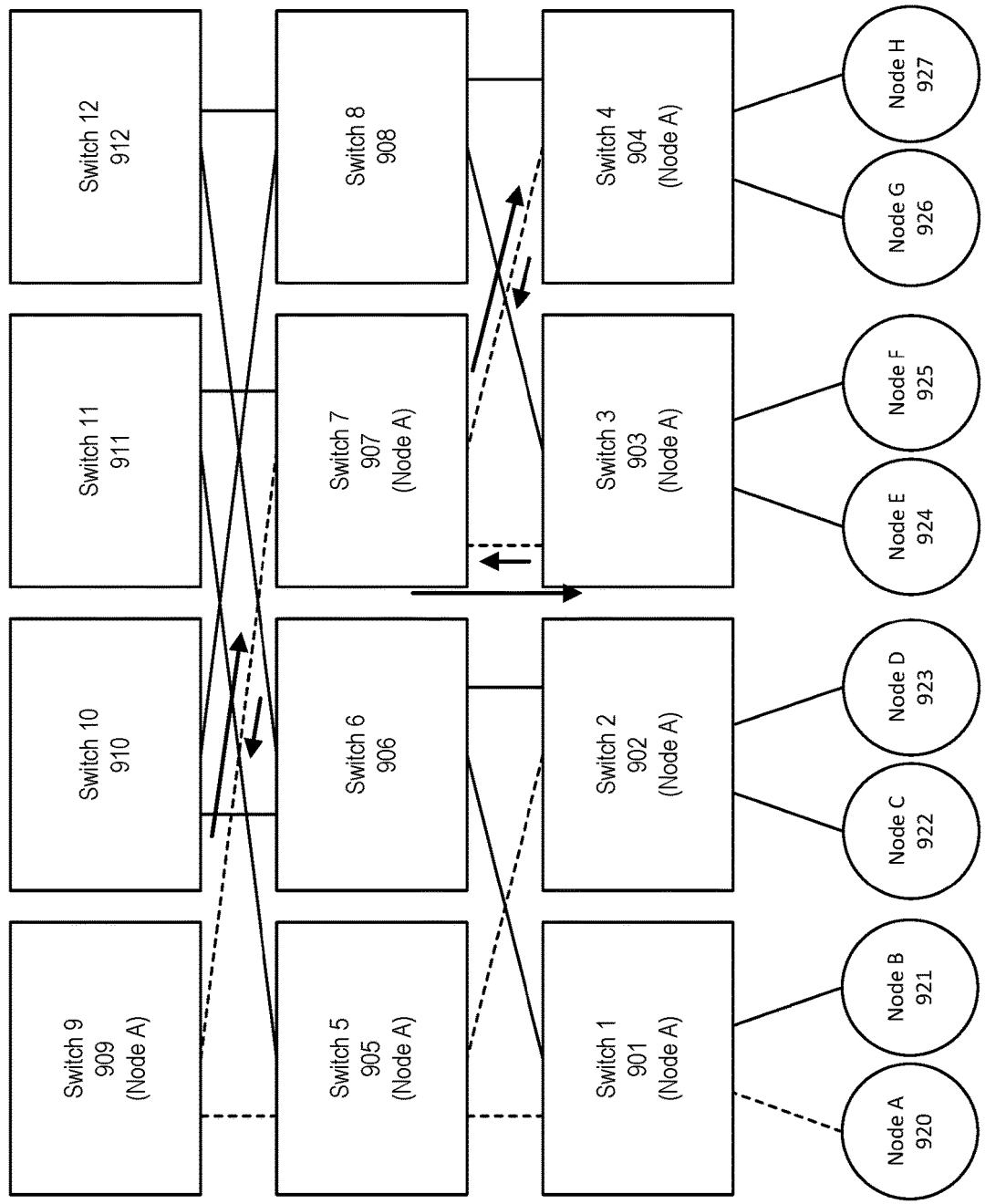
FIG. 12 shows a system for a phase of node routing, in according with an embodiment.

FIG. 12 shows a system for a phase of node routing, in accordance with an embodiment. Switches 901-912 in the figure are marked with numbers from 1-12. Each switch can comprise a plurality of ports (not shown). For example, each switch can comprise 32 ports—16 down and 16 up. Each of switches 1, 2, 3, 4, can also be linked to two or more nodes, such as nodes A and B 920 and 921 linked to switch 1, nodes C and D 922 and 923 linked to switch 2, node E and F 924 and 925 linked to switch 3, and nodes G and H 926 and 927 linked to switch 4. A same or similar recursive operation as described in FIGS. 9, 10 and 11, continues until route entries for the selected node have been added to all of the necessary switches in the fabric. As shown in FIG. 12, a route up by going down operation exists between switch 9 and switch 7, and two route up by going down operations are performed, one between switch 7 and switch 3, and one between switch 7 and switch 4. The dashed lines in the figure represent routes that have been assigned to node A. At this point, routes from all nodes to node A have been defined in the system. Such operations can be repeated for each node in the system, maintaining port counters, until all nodes have all routes calculated.

Note that the routing towards node A has been completed, but there are some blank switches without routes towards node A; the switches 6, 8, 10, 11, 12. In reality, FTree can add routes in these blank switches as well. If a packet towards node A arrives for example in switch 12, this switch knows that it has to forward the received packet down towards switch 6, while switch 6 knows that the received packet from 12 has to be forwarded to switch 1 to reach its destination A. However, the switches in the lower levels will never forward traffic towards node A to switch 12 because the routes upward will always push the packets towards switch 9. Note that the use of a single root switch per destination node counters the growth of wide congestion trees.

In accordance with an embodiment, a fast hybrid reconfiguration method can be based on the notion that HPC systems and cloud environments are shared by multiple tenants that run isolated tasks, i.e., tenant inter-communication is not allowed. To achieve better resource utilization, the workload deployment or virtual machine placement scheduler tries to avoid resource fragmentation to the extent possible. Consequently, per-tenant workloads are mapped onto physical machines that are close-by with regards to physical network connectivity, in order to avoid unnecessary network traffic and cross-tenant network interference. For Fat-Tree topologies with more than two levels, this means that the per-tenant traffic can be contained within a sub-tree of the multi-level Fat-Tree.

Figure 13:
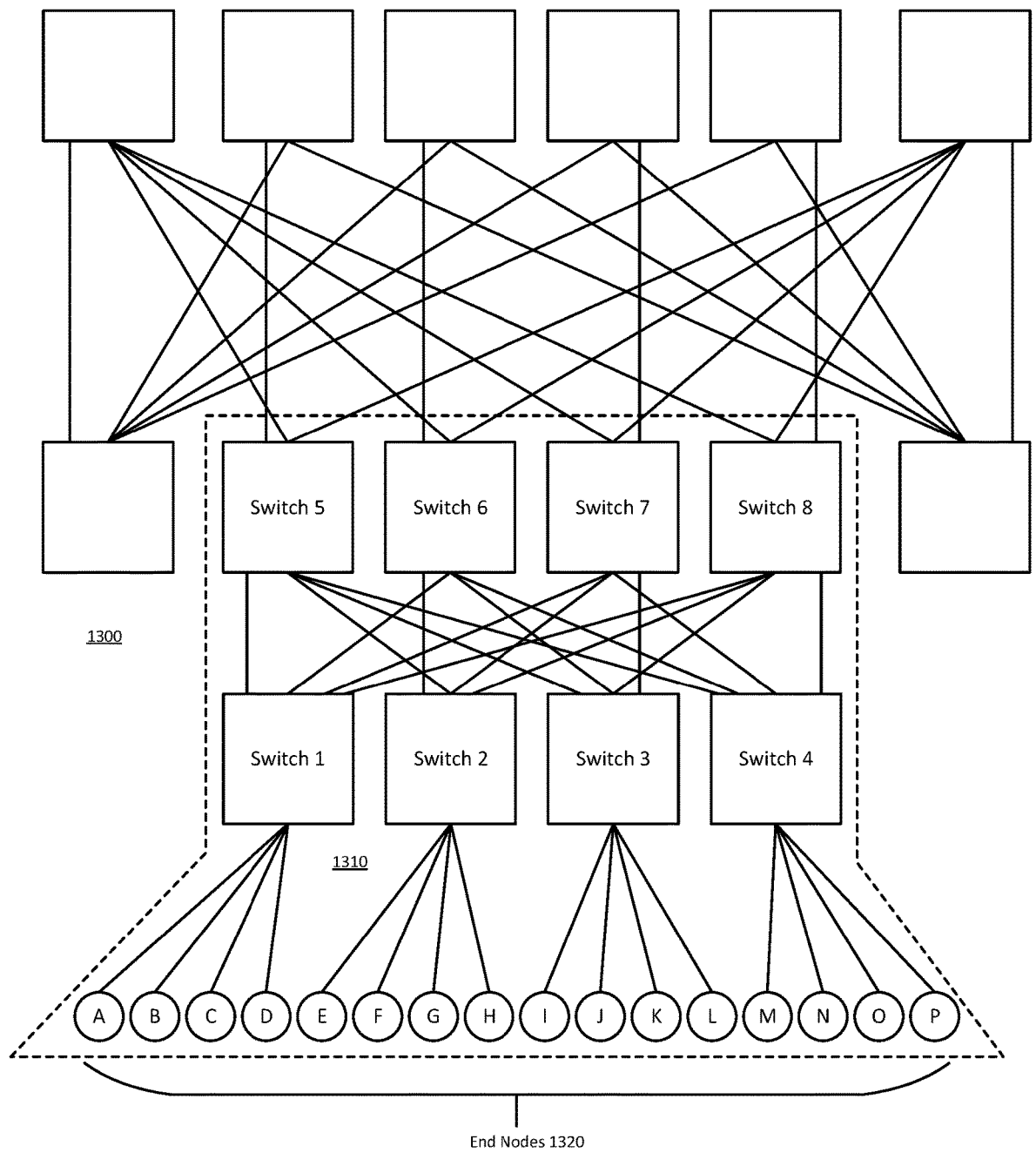
FIG. 13 shows a system comprising a Fat-Tree topology having more than two levels, in accordance with an embodiment.

FIG. 13 shows a system comprising a Fat-Tree topology having more than two levels, in accordance with an embodiment. Within a Fat-Tree topology subnet 1300 having a number of switch levels (3 switch levels in the depicted embodiment), a sub-tree 1310 (also referred to herein as a sub-subnet) can be defined wherein traffic within the sub-tree 1310 is wholly contained. That is, traffic within the sub-tree 1310 (that is, between the end nodes 1320, which span from end node A to end node P) is not flowing to or from the remainder of the topology. As an example, the end nodes 1320 can all belong to a same partition (e.g., all nodes in 1320 share a common partition key (P_Key)). It should be noted, that while not shown, each of end nodes can be connected to the switched network via a host channel adapter (HCA).

In accordance with an embodiment, a fast hybrid reconfiguration method can apply a partial reconfiguration and optimize locally within the sub-subnet based on the internal traffic pattern only. By applying such a partial reconfiguration, the method can effectively treat the reconfiguration as a Fat-Tree with less levels, and as which can reduce the cost of path-computation and overall reconfiguration. In effect, performance-driven reconfiguration becomes attractive even in shared and highly dynamic environments. Moreover, when applying partial reconfiguration, the method only needs to alter the forwarding entries of the nodes within the sub-subnet 1310. Given that the initial routing algorithm used to route the fabric was FTree or similar, that guarantees deadlock freedom by applying a variant of up/down routing without using Virtual Lanes, the method can use any best-fit routing algorithm to reroute the given sub-tree as isolated (Hybrid Reconfiguration).

In accordance with an embodiment, once a sub-tree of a Fat-Tree is reconfigured, the connectivity between all end nodes, even those outside of the reconfigured sub-subnet, is still maintained. Because the switches have LFTs that dictate where to forward traffic towards any destination. That is, every switch S has a valid forwarding entry in the LFT for every destination x, even if other nodes will never actually forward packets destined for x through S. For example, after an initial routing selected where within a sub-tree a switch at a level one higher than a leaf switch, which will be called switch 5, was chosen to route traffic downwards towards node A and switch 6, on the same level as switch 5, was chosen to route traffic towards node B. After the reconfiguration of the sub-tree, switch 5 is now used to route traffic towards node B and switch 6 towards node A. In this case, if nodes E and F, located inside the sub-tree, send traffic towards nodes A or B, the newly calculated paths will be used, and traffic will remain entirely within the sub-tree. However, if nodes located outside of the sub-tree (not shown), send traffic to nodes A and B, the old paths (i.e., not part of the reconfiguration as those paths are outside the sub-tree) will be used; the traffic towards A and B will enter the sub-tree at the switches designated by the original routing of the entire subnet. Such behavior external to the sub-tree could potentially disturb the purpose of the sub-tree reconfiguration, e.g., by interfering with any sub-tree internal load balancing. However, when a sub-tree is configured such that little to no traffic crosses the sub-tree boundary (e.g., when a sub-tree comprises an entire partition), such interference is of minor concern.

In accordance with an embodiment, in order to apply a partial reconfiguration, the method can first choose all the nodes and switches in a sub-tree that have to be reconfigured. The method can use the switch-tuples to choose which sub-tree to reconfigure. For a partial reconfiguration, the method can select all nodes and switches in the sub-tree that need to be reconfigured. The selection and consideration of all nodes in the sub-tree is necessary. The selection process of all entities in a sub-tree can go through the following steps:

1) An administrator (or an automated solution that monitors the fabric utilization) provides a list of nodes that are to participate in the reconfiguration.
2) The tuples of the leaf switches of the nodes from step 1 are compared and the common ancestor sub-tree selected.
3) All the switches that belong to the sub-tree that was selected in step 2 will be marked for reconfiguration.
4) From the list of switches in step 3, the leaf switches will be picked and all of the nodes connected to the picked leaf switches will participate in the reconfiguration process.
5) Last, a routing algorithm has to calculate a new set of routes only for the nodes selected in step 4, and distribute the LFTs only to the switches selected in step 3.

In accordance with an embodiment, in multistage switch topologies like Fat-Trees, the effective bisection bandwidth is usually less than the theoretical bisection bandwidth for different traffic patterns. The reason is that depending on which node pairs have been selected for communication, there might be links that are shared in the upward direction. An example is illustrated in FIG. 14.

Figure 14:
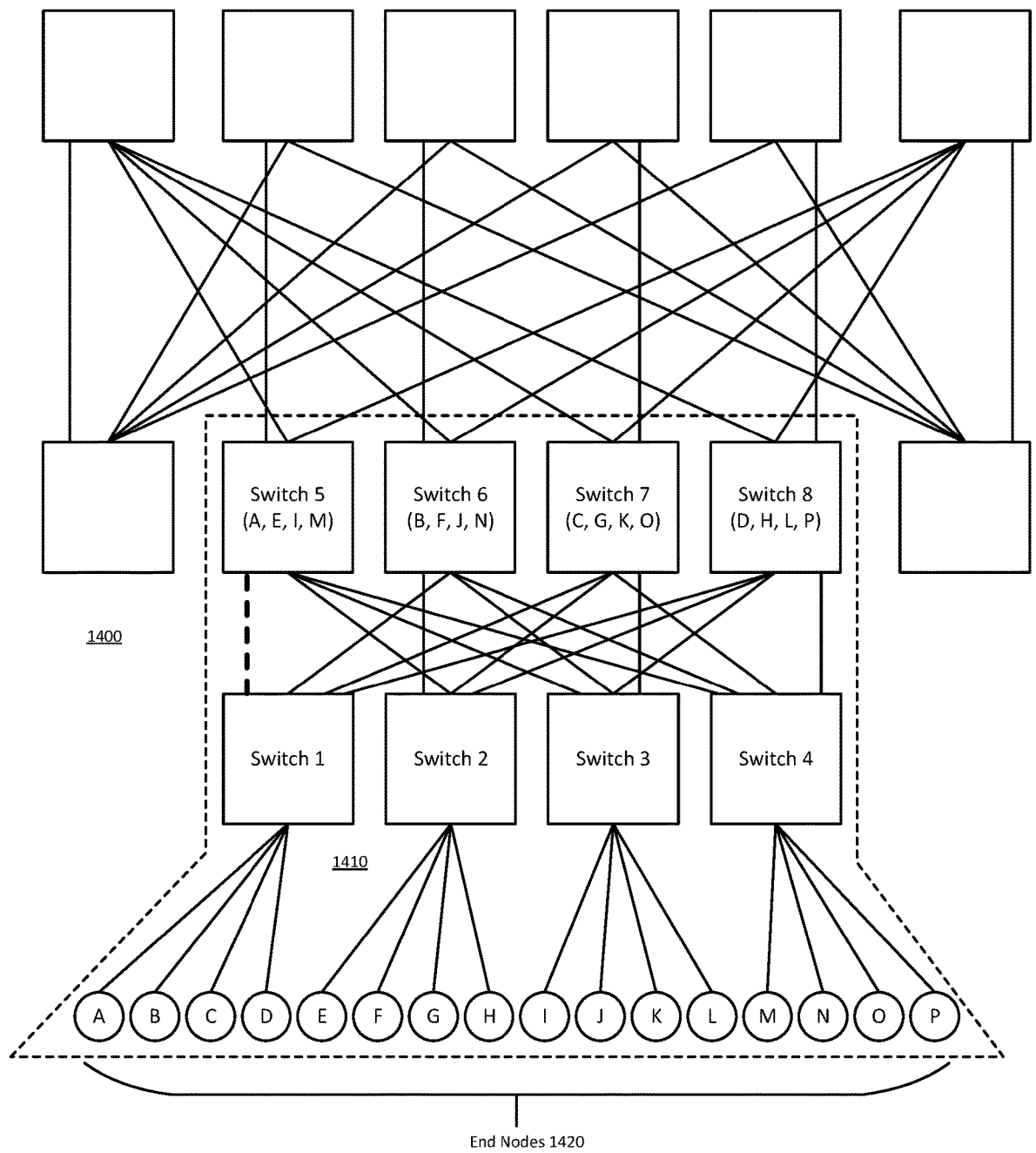
FIG. 14 shows a system for fast hybrid reconfiguration, in accordance with an embodiment.

FIG. 14 shows a system for fast hybrid reconfiguration, in accordance with an embodiment. Within a Fat-Tree topology subnet 1400 having a number of switch levels (3 switch levels in the depicted embodiment), a sub-tree 1410 can be defined wherein traffic within the sub-subnet 1410 is wholly contained. That is, traffic within the sub-subnet 1410 (that is, between the end nodes 1420, which span from end node A to end node P) is not flowing to or from the remainder of the topology. As an example, the end nodes 1420 can all belong to a same partition.

As shown in the figure, the end nodes 1420 (end nodes A through P) can communicate within a two-level sub-tree (indicated as 1410) of a three-level Fat-Tree globally routed with the FTree routing algorithm. In the depicted embodiment, the routing method, FTree, has selected: switch 5 to route downwards to nodes A, E, I, and M; switch 6 to route downwards to nodes B, F, J, and N; switch 7 to route downwards to nodes C, G, K, and O; and switch 8 to route downwards to nodes D, H, L, and P. Although this sub-tree has a full theoretical bisection bandwidth, the effective bisection bandwidth in the illustrated communication pattern where nodes B, C and D send traffic to nodes E, I and M, respectively, is ⅓ of the full bandwidth. This is because all the destination nodes are routed through the same switch in the second level, switch 5, and the thick dashed link connecting switch 1 and switch 5 is shared by all three flows and becomes a bottleneck for traffic. However, there are enough empty links to avoid link sharing and provide full bandwidth. To allow for flexible reconfigurations that are not always bound to the same routing order that is based in the port order, a fast hybrid reconfiguration scheme can use a Fat-Tree routing mechanism, which can be referred to as NoFTree, that uses a user-defined Node ordering to route a Fat-Tree network. This can provide enhancements. A simple way to determine the receiving traffic per node is to read the IB port counters. In such a way, an administrator doesn't have to know details about the jobs executed by tenants.

In accordance with an embodiment, NoFTree can be used in the context of a Fast Hybrid Reconfiguration Scheme, and routes a sub-tree after the switches and nodes have been selected as described above. The scheme can follow these steps:

1) An ordered list of nodes to be routed is provided by the user or by a monitoring solution.
2) NoFTree re-orders the nodes per leaf-switch. Then each ordered node is placed in the n % max nodes per leaf sw+1 slot to be routed in the given leaf-switch, where n is the global position of the node in the re-ordered list of nodes.
3) Remaining nodes that are connected to each leaf-switch, but not present in the provided node ordering list are filling the remaining leaf-switch routing slots based on the port order that nodes are connected to. If no port ordering is provided by the user, NoFTree can work exactly as the FTree routing algorithm.
4) NoFTree iterates through each leaf-switch again and routes each node based on the node order that has been constructed throughout the previous steps.

Figure 15:
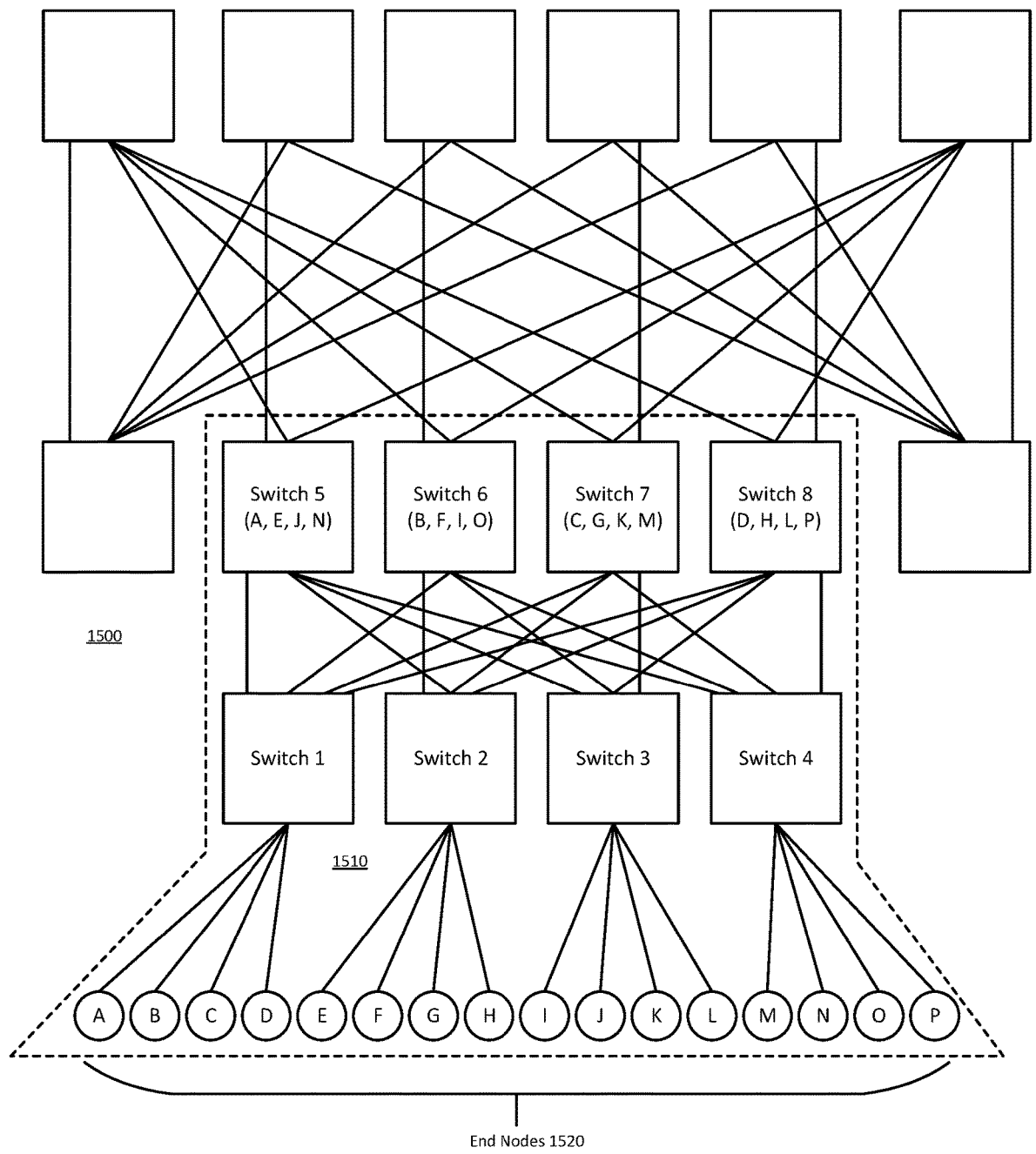
FIG. 15 shows a system for fast hybrid reconfiguration, in accordance with an embodiment.

FIG. 15 shows a system for fast hybrid reconfiguration, in accordance with an embodiment. Within a Fat-Tree topology subnet 1500 having a number of switch levels (3 switch levels in the depicted embodiment), a sub-tree 1510 can be defined wherein traffic within the sub-subnet 1510 is wholly contained. That is, traffic within the sub-subnet 1510 (that is, between the end nodes 1520, which span from end node A to end node P) is not flowing to or from the remainder of the topology. As an example, the end nodes 1520 can all belong to a same partition.

As shown in the figure, the end nodes 1520 (end nodes A through P) can communicate within a two-level sub-tree (indicated as 1510) of a three-level Fat-Tree globally routed with the FTree routing algorithm. In the depicted embodiment, the routing method, NoFTree has reconfigured the sub-tree of FIG. 15 using a supplied/received node order E, I, M, and has selected: switch 5 to route downwards to nodes A, E, J, and N; switch 6 to route downwards to nodes B, F, I, and O; switch 7 to route downwards to nodes C, G, K, and M; and switch 8 to route downwards to nodes D, H, L, and P.

In this case the supplied/received node order that NoFTree uses for the reconfiguration is E, I, M. Since no node from leaf-switch 1 has been provided in the node ordering, nodes connected to switch 1 are routed based on the port order. Node E is the first node in the global node ordering and the first node to be ordered in leaf switch 2, so node E becomes the first node to be routed in switch 2 (routed downwards from switch 5). The rest of the nodes on leaf switch 2, nodes F, G, H, are routed following the port order. Then the mechanism moves to the 3rd leaf switch, switch 3, where node I from the provided/received node ordering is connected. Node I is the second node in the provided/received node ordering and the first node to be ordered in switch 3, so node I becomes the second node to be routed in switch 3, routed downwards from switch 6. The nodes connected to switch 4 are routed in the same fashion. The remaining routing occurs as indicated above and in the figure. In this scenario, a performance gain of 300% can be achieved since there is no upward link sharing anymore with traffic flowing to nodes E, I, and M from nodes B, C, and D.

Figure 16:
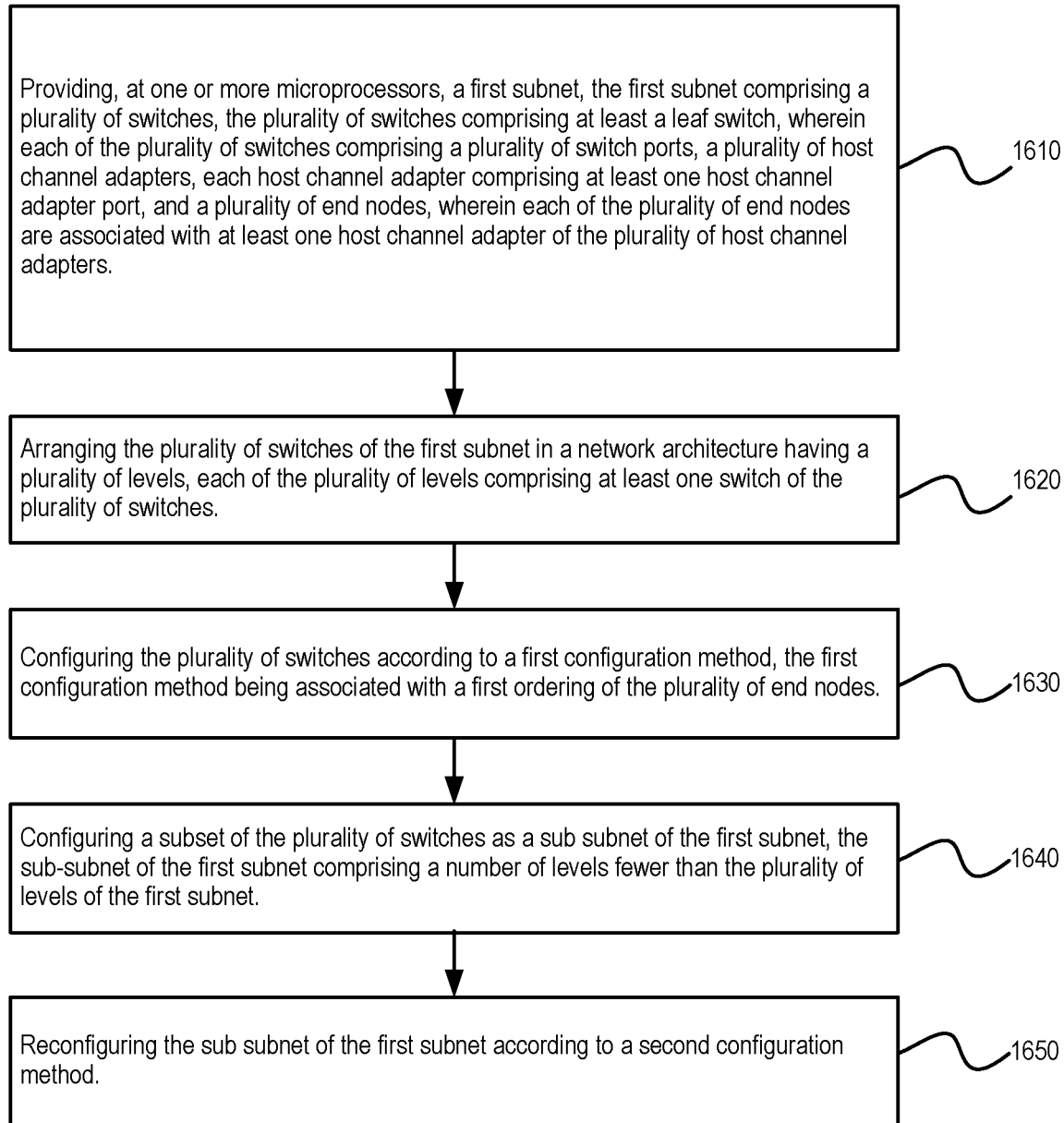
FIG. 16 is a flow chart of an exemplary method for supporting fast hybrid reconfiguration in a high performance computing environment, in accordance with an embodiment.

FIG. 16 is a flow chart of an exemplary method for supporting fast hybrid reconfiguration in a high performance computing environment, in accordance with an embodiment.

At step 1610, the method can provide, at one or more microprocessors, a first subnet, the first subnet comprising a plurality of switches, the plurality of switches comprising at least a leaf switch, wherein each of the plurality of switches comprising a plurality of switch ports, a plurality of host channel adapters, each host channel adapter comprising at least one host channel adapter port, and a plurality of end nodes, wherein each of the plurality of end nodes are associated with at least one host channel adapter of the plurality of host channel adapters.

At step 1620, the method can arrange the plurality of switches of the first subnet in a network architecture having a plurality of levels, each of the plurality of levels comprising at least one switch of the plurality of switches.

At step 1630, the method can configure the plurality of switches according to a first configuration method, the first configuration method being associated with a first ordering of the plurality of end nodes.

At step 1640, the method can configure a subset of the plurality of switches as a sub-subnet of the first subnet, the sub-subnet of the first subnet comprising a number of levels fewer than the plurality of levels of the first subnet.

At step 1650, the method can reconfigure the sub-subnet of the first subnet according to a second configuration method.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting fast hybrid reconfiguration in a high performance computing environment, comprising:
   one or more microprocessors;
   a first subnet, the first subnet comprising:
      a plurality of switches arranged in a discrete number of levels,
      a plurality of end nodes, wherein the plurality of end nodes of the first subnet are interconnected via the plurality of switches, wherein each of the end nodes comprises an ordering number;
   wherein the first subnet is configured according to a first configuration method, wherein the first configuration method utilizes the ordering number of each of the end nodes;
   wherein a subset of the plurality of switches and a subset plurality of end nodes are configured as a sub-subnet, the subset of the plurality of switches comprising fewer switches than the plurality of switches, wherein traffic between the subset of the plurality of end nodes is confined to the subset of the plurality of switches;
   wherein only the sub-subnet is reconfigured according to a second configuration method, the first and second configuration methods being different, wherein the second configuration method utilizes the ordering number of each of the subset of the plurality of end nodes.

2. The system of claim 1, further comprising:
   a management entity, wherein the management entity is provided at one of the plurality of switches.

3. A method for supporting fast hybrid reconfiguration in a high performance computing environment, comprising:
   providing, at one or more computers including one or more microprocessors, a first subnet, the first subnet comprising:
      a plurality of switches arranged in a discrete number of levels, and
      a plurality of end nodes, wherein the plurality of end nodes of the first subnet are interconnected via the plurality of switches, wherein each of the end nodes comprises an ordering number;
   configuring the first subnet according to a first configuration method, wherein the first configuration method utilizes the ordering number of each of the end nodes;
   configuring a subset of the plurality of switches and a subset plurality of end nodes as a sub-subnet, the subset of the plurality of switches fewer switches than the plurality of switches, wherein traffic between the subset of the plurality of end nodes is confined to the subset of the plurality of switches;
   reconfiguring only the sub-subnet according to a second configuration method, the first and second configuration methods being different, wherein the second configuration method utilizes the ordering number of each of the subset of the plurality of end nodes.

4. The method of claim 3, further comprising:
   providing a management entity at one of the plurality of switches.

5. A non-transitory computer readable storage medium, including instructions stored thereon for supporting fast hybrid reconfiguration in a high performance computing environment, which when read and executed by one or more computers cause the one or more computers to perform steps comprising:
   providing, at one or more computers including one or more microprocessors, a first subnet, the first subnet comprising:
      a plurality of switches arranged in a discrete number of levels, and
      a plurality of end nodes, wherein the plurality of end nodes of the first subnet are interconnected via the plurality of switches, wherein each of the end nodes comprises an ordering number;
   configuring the first subnet according to a first configuration method, wherein the first configuration method utilizes the ordering number of each of the end nodes;
   configuring a subset of the plurality of switches and a subset plurality of end nodes as a sub-subnet, the subset of the plurality of switches fewer switches than the plurality of switches, wherein traffic between the subset of the plurality of end nodes is confined to the subset of the plurality of switches;
   reconfiguring only the sub-subnet according to a second configuration method, the first and second configuration methods being different, wherein the second configuration method utilizes the ordering number of each of the subset of the plurality of end nodes.

6. The non-transitory computer readable storage medium of claim 5 the steps further comprising:
   providing a management entity at one of the plurality of switches.

* * * * *

UNITED STATES PATENT AND TRADEMARK OFFICE
CERTIFICATE OF CORRECTION

PATENT NO. : 11,716,247 B2
APPLICATION NO. : 16/887328
DATED : August 1, 2023
INVENTOR(S) : Tasoulas et al.

It is certified that error appears in the above-identified patent and that said Letters Patent is hereby corrected as shown below:

In the Specification

In Column 11, Line 14, delete "dadditional" and insert -- additional --, therefor.

In Column 11, Line 14, after "PF" insert -- . --, therefor.

In Column 13, Line 3, after "routes" insert -- . --, therefor.

In Column 24, Line 10, delete "switches fewer" and insert -- switches comprise fewer --, therefor.

In Column 24, Line 42, delete "switches fewer" and insert -- switches comprise fewer --, therefor.

Signed and Sealed this
Twenty-eighth Day of May, 2024

Katherine Kelly Vidal
*Director of the United States Patent and Trademark Office*